United States Patent
Davila-Rodriguez et al.

(10) Patent No.: US 11,821,801 B1
(45) Date of Patent: Nov. 21, 2023

(54) IMPLEMENTATION OF A DUAL FABRY-PEROT PHOTONIC PRESSURE SENSOR

(71) Applicant: Stable Laser Systems, Inc., Boulder, CO (US)

(72) Inventors: Josue Davila-Rodriguez, Boulder, CO (US); David Lee, Boulder, CO (US); Mark Notcutt, Boulder, CO (US); Michael Grisham, Boulder, CO (US); Nathaniel Phillips, Boulder, CO (US)

(73) Assignee: Stable Laser Systems, Inc., Boulder, CO (US)

( * ) Notice: Subject to any disclaimer, the term of this patent is extended or adjusted under 35 U.S.C. 154(b) by 741 days.

(21) Appl. No.: 16/745,671

(22) Filed: Jan. 17, 2020

Related U.S. Application Data

(60) Provisional application No. 62/880,184, filed on Jul. 30, 2019, provisional application No. 62/794,179, filed on Jan. 18, 2019.

(51) Int. Cl.
  *G01L 11/02* (2006.01)
  *G02B 27/10* (2006.01)
  (Continued)

(52) U.S. Cl.
  CPC ............. *G01L 1/02* (2013.01); *G01C 19/727* (2013.01); *G01N 21/45* (2013.01); *G02B 27/10* (2013.01)

(58) Field of Classification Search
  CPC ........ G01L 11/02; G02B 27/10; G01N 21/45; G01N 19/45; G01C 19/727
  (Continued)

(56) References Cited

U.S. PATENT DOCUMENTS

| | | |
|---|---|---|
| 6,539,136 B1 | 3/2003 | Dianov et al. |
| 8,642,982 B2 | 2/2014 | Plusquellic et al. |
| | (Continued) | |

FOREIGN PATENT DOCUMENTS

| | | | |
|---|---|---|---|
| CN | 1648637 A | * | 8/2005 |
| CN | 101055243 A | * | 10/2007 |
| | (Continued) | | |

OTHER PUBLICATIONS

Translation KR101003028 (Year: 2010).*
(Continued)

*Primary Examiner* — Peter J Macchiarolo
*Assistant Examiner* — Monica S Young
(74) *Attorney, Agent, or Firm* — Leydig, Voit & Mayer, Ltd.

(57) ABSTRACT

In an aspect, a pressure sensor for determining pressure in an environment comprises: a source for emitting a coherent reference light characterized by a reference light frequency; a first lock-in mechanism configured to send an electrical signal to the source based on a reference resonance frequency; a reference cavity; wherein the reference cavity is characterized by the reference resonance frequency; a modulator configured a reference light to generate at least a first sideband frequency such that an output of said modulator is a measurement light characterized by at least the first sideband frequency; a frequency synthesizer configured to drive the modulator; a second lock-in mechanism configured to send an electrical signal to the frequency synthesizer based on a measurement resonance frequency; and a measurement cavity configured to receive at least a portion of the measurement light; wherein the measurement cavity is characterized by the measurement resonance frequency; and wherein the pressure of the environment is determined based
(Continued)

on the reference resonant frequency and the measurement resonance frequency.

22 Claims, 17 Drawing Sheets

(51) Int. Cl.
 G01C 19/72 (2006.01)
 G01N 21/45 (2006.01)
 G01L 1/02 (2006.01)
(58) Field of Classification Search
 USPC .......................................................... 73/705
 See application file for complete search history.

(56) References Cited

U.S. PATENT DOCUMENTS

| | | | |
|---|---|---|---|
| 9,719,878 B2 | 8/2017 | Hendricks et al. | |
| 10,141,712 B1 | 11/2018 | Notcutt et al. | |
| 2009/0109423 A1 | 4/2009 | Carr | |
| 2012/0251129 A1* | 10/2012 | Delfyett | H01S 5/0656 |
| | | | 398/188 |
| 2014/0320856 A1* | 10/2014 | McKeever | G01J 3/4338 |
| | | | 356/326 |
| 2015/0077736 A1 | 3/2015 | Reinsch et al. | |
| 2020/0041255 A1* | 2/2020 | Ahmed | G02B 27/1006 |
| 2020/0041379 A1* | 2/2020 | Douglass | G02B 6/3588 |
| 2020/0355606 A1* | 11/2020 | Douglass | G01B 9/02011 |

FOREIGN PATENT DOCUMENTS

| | | | | |
|---|---|---|---|---|
| CN | 101387608 | A | * | 3/2009 |
| CN | 105136358 | | | 12/2015 |
| CN | 109507132 | A | * | 3/2019 |
| EP | 2456285 | | | 5/2012 |
| EP | 2638418 | | | 9/2013 |
| KR | 101003028 | B1 | * | 12/2010 |
| WO | WO 2012/063033 | | | 5/2012 |

OTHER PUBLICATIONS

Translation CN_101055243 (Year: 2007).*
Bae et al. (2014) "Hybrid Miniature Fabry-Perot Sensor with Dual Optical Cavities for Simultaneous Pressure and Temperature Measurements," Journal of Lightwave Technology 32(8): 1585-1593
Banyal et al. (2017) "A dual cavity Fabry-Perot device for high precision Doppler measurements in astronomy," Journal of Astronomical Instrumentation 6(1): 1750001, 16 pp.
Black (2001) "An introduction to Pound-Drever-Hall laser frequency stabilization," American Journal of Physics 69(1): 79-87
Egan et al. (2011) "Absolute refractometry of dry gas to ±3 parts in $10^9$," Applied Optics 50(19): 3076-3086
Egan et al. (2015) "Performance of a dual Fabry-Perot cavity refractometer," Optics letters 40(17): 3945-3948.
Egan et al. (2016) "Comparison measurements of low-pressure between a laser refractometer and ultrasonic manometer," Rev. Sci. Intrum. 87(5): 053113-1-053113-7.
Egan et al. (2016) "Laser Refractometer as a Transfer Standard of the Pascal," CPEM Jul. 10-15, 2016, Ottawa, ON, Canada, 2 pp.
Egan et al. (2017) "Cell-based refractometer for pascal realization," Opt. Lett. 42(15): 2944-2947.
Egan et al. (Apr. 2019) "Measured relationship between thermodynamic pressure and refractivity for six candidate gases in laser barometry," Journal of Vacuum Science & Technology A 37(3): 031603, 16 pp.
Gaiser et al. (Mar. 2018) "Polarizability of Helium, Neon, and Argon: New Perspectives for Gas Metrology," Phys. Rev. Lett. 120: 123203, 5 pp.
Garcia et al. (2010) "Vibration Detection Using Optical Fiber Sensors," Journal of Sensors 2010: 936487, pp. 1-12.
Gundavarapu et al. (publicly available Dec. 2018) "Sub-hertz fundamental linewidth photonic integrated Brillouin laser," Nature Photonics (Jan. 2019) 13: 60-67.
Hendricks et al. (2014) "Refraction redefines the pascal," Physics World: 13-14.
Hendricks et al. (2015) "Measuring Pressure and Vacuum with Light: A New Photonic, Quantum-Based, Pressure Standard," XXI IMEKO World Congress "Measurement in Research and Industry" Aug. 30-Sep. 4, 2015, Prague, Czech Republic, 4 pp.
Hendricks et al. (2018) "The Emerging Field of Quantum Based Measurements for Pressure, Vacuum and Beyond," J. Phys. Conf. Ser. 1065: 162017, pp. 1-4.
Hummon et al. (Apr. 2018) "Photonic chip for laser stabilization to an atomic vapor with $10^{-11}$ instability," Optica 5, 443-449.
Jousten et al. (2017) "Perspectives for a new realization of the pascal by optical methods," Metrologia 54(6): S146-S161.
Li et al. (2012) "Characterization of a high coherence, Brillouin microcavity laser on silicon," Optics Express 20(18): 20170-20180.
Lin et al. (2012) "A Novel Fabry-Perot Cavity Fiber Sensor," Physics Procedia 33: 1939-1946.
Livas et al. (2009) "Frequency-tunable pre-stabilized lasers for LISA via sideband locking," Classical and Quantum Gravity 26(9), 10 pp.
Loh et al. (Feb. 2019) "Ultra-Narrow Linewidth Brillouin Lasers with Nanokelvin temperature self-referencing," Optica 6(2): 152-159.
Scherschligt et al. (publicly available Jun. 2018) "Quantum-based vacuum metrology at the National Institute of Standards and Technology," Journal of Vacuum Science & Technology A (Jul./Aug. 2018) 36(4): 040801-1-040801-14.
Silander et al. (2013) "Optical measurement of the gas number density in a Fabry-Perot cavity," Meas. Sci. Technol. 24(10): 105207: 1-5.
Silander et al. (2017) "Fast switching dual Fabry-Perot cavity optical refractometry—methodologies for accurate assessment of gas density," arXiv 1704.01186 [last revised Jan. 2018], pp. 1-11 and "Supplementary Material" (2 pp.).
Silander et al. (May 2019) "Gas equilibration gas modulation refractometry (GEq-GAMOR) for assessment of pressure with sub-ppm precision," arXiv:1903.08424v1, 50 pp., DOI 10.1116/1.5090860.
Sun et al. (2010) "Technology Development for Space Time Asymmetry Research (STAR) Mission" Astro 2010 White Paper for Technology Development, pp. 1-11.
Thorpe et al. (2008) "Laser frequency stabilization and control through offset sideband locking to optical cavities," Optics Express 16(20): 15980-15990.
Vivien et al. (2008) "Vertical multiple-slot waveguide ring resonators in silicon nitride," Optics Express 16(22): 17237-17242.
Webster et al. (2011) "Force-insensitive optical cavity," Optics Letters 36(18): 3572-3574.
Zhang et al. (2014) "Ultralow sensing limit in optofluidic microbottle resonator biosensor by self-referenced differential-mode detection scheme," Appl. Phys. Lett. 104(3): 033703, 4 pp.

* cited by examiner

Polarization beam combiner/splitter

IMPLEMENTATION OF A DUAL FABRY-PEROT PHOTONIC PRESSURE SENSOR

CROSS-REFERENCE TO RELATED APPLICATIONS

This application claims the benefit of priority to U.S. Provisional Patent Application Nos. 62/794,179 filed Jan. 18, 2019 and 62/880,184 filed Jul. 30, 2019, each of which is hereby incorporated by reference in its entirety.

SUMMARY OF THE INVENTION

Provided herein are pressure sensors and associated methods for measuring a pressure of an environment. The pressure sensors may be referred to as photonic pressure sensors. These sensors provide an improved degree of precision within useful ranges of pressure, such as, but not limited to, 1 to 100 kPa. Certain embodiments of these sensors reduce the number and/or complexity of components compared to cavity-based conventional systems in order to provide for more portable and cost-efficient systems.

In an aspect, a pressure sensor for determining pressure in an environment comprises: a source for emitting a coherent reference light characterized by a reference light frequency; a first lock-in mechanism configured to send an electrical signal to the source based on a reference resonance frequency; a reference cavity; wherein the reference cavity is characterized by the reference resonance frequency; a modulator configured a reference light to generate at least a first sideband frequency such that an output of said modulator is a measurement light characterized by at least the first sideband frequency; a frequency synthesizer configured to drive the modulator; a second lock-in mechanism configured to send an electrical signal to the frequency synthesizer based on a measurement resonance frequency; and a measurement cavity configured to receive at least a portion of the measurement light; wherein the measurement cavity is characterized by the measurement resonance frequency; and wherein the pressure of the environment is determined based on the reference resonant frequency and the measurement resonance frequency. Optionally, a pressure in an internal volume or in a reference space of the reference cavity is less than 0.1 mTorr.

In an aspect, a pressure sensor for determining pressure in an environment comprises: a source for emitting a coherent reference light characterized by a reference light frequency; wherein the coherent reference light is further characterized by at least one phase modulation frequency; an optical splitter for splitting the reference light into at least a first reference light and a second reference light; a first lock-in mechanism configured to send an electrical signal to the source based on a reference resonance frequency; a reference cavity configured to receive at least a portion of the first reference light; wherein the reference cavity is characterized by the reference resonance frequency; and wherein a pressure within an internal volume or in a reference space of the reference cavity is less than or equal to 0.1 mTorr; a modulator configured to receive the second reference light and modulate the second reference light to generate at least a first sideband frequency such that an output of said modulator is a measurement light characterized by at least the first sideband frequency; a frequency synthesizer configured to drive the modulator; a second lock-in mechanism configured to send an electrical signal to the frequency synthesizer based on a measurement resonance frequency; and a measurement cavity configured to receive at least a portion of the measurement light; wherein the measurement cavity is characterized by the measurement resonance frequency; and wherein the pressure of the environment is determined based on the reference resonant frequency and the measurement resonance frequency.

In an aspect, a method for measuring pressure of an environment comprises steps of: introducing the coherent reference light into the reference cavity; providing feedback to the source via the first lock-in mechanism for locking the reference frequency of the reference light to the reference resonant frequency of the reference cavity; generating the first sideband frequency of the measurement light via modulation of the second reference light via the modulator; introducing the measurement light into the measurement cavity; providing feedback to the microwave synthesizer via the second lock-in mechanism for locking the first sideband frequency to the measurement resonant frequency of the measurement cavity; and determining the pressure of the environment based on the reference resonance frequency and the measurement reference frequency.

In another aspect, a pressure sensor for determining pressure in an environment comprises: a source for emitting a coherent reference light characterized by a reference light frequency; wherein the coherent reference light is further characterized by at least one phase modulation frequency; a modulator configured to receive the coherent reference light and modulate the coherent reference light to generate at least a first sideband frequency and a second sideband frequency such that an output of said modulator is a modulated light characterized by at least the first sideband frequency and the second sideband frequency; a frequency synthesizer configured to drive the modulator; an optical splitter for splitting the modulated light into at least a first reference light and a measurement light; a first lock-in mechanism configured to send an electrical signal to the source based on a reference resonance frequency; a reference cavity configured to receive at least a portion of the first reference light; wherein the reference cavity is characterized by the reference resonance frequency; and wherein a pressure within an internal volume or in a reference space of the reference cavity is less than or equal to 0.1 mTorr; a second lock-in mechanism configured to send an electrical signal to the frequency synthesizer based on a measurement resonance frequency; and a measurement cavity configured to receive at least a portion of the measurement light; wherein the measurement cavity is characterized by the measurement resonance frequency; and wherein the pressure of the environment is determined based on the reference resonant frequency and the measurement resonance frequency.

In an aspect, a method for measuring pressure of an environment comprises steps of: introducing the coherent reference light to the modulator; generating the first sideband frequency and the second sideband frequency of the modulated light via modulation of the reference light via the modulator; splitting the modulated light into a reference light and a measurement light; introducing the first reference light into the reference cavity; providing feedback to the source via the first lock-in mechanism for locking the first sideband frequency of the modulated light to the reference resonant frequency of the reference cavity; introducing the measurement light into the measurement cavity; providing feedback to the microwave synthesizer via the second lock-in mechanism for locking the second sideband frequency of the measurement light to the measurement resonant frequency of the measurement cavity; determining the pressure of the environment based on the reference resonance frequency and the measurement reference frequency.

In an aspect, a pressure sensor for determining pressure in an environment comprises: a first source for emitting a coherent reference light characterized by a reference light frequency; a first optical circulator in optical communication with the first source via an optical fiber; a second source for emitting a measurement coherent light characterized by a measurement light frequency; a second optical circulator in optical communication with the second source via an optical fiber; a fiber optic coupler in optical communication with the first optical circulator via an optical fiber and with the second optical circulator via an optical fiber; a reference cavity in optical communication with the fiber optic coupler via an optical fiber and configured to receive at least a portion of the coherent reference light from the fiber optic coupler; wherein the reference cavity is characterized by the reference resonance frequency; and wherein a pressure in a reference space of the reference cavity is less than or equal to 0.1 mTorr; a measurement cavity in optical communication with the fiber optic coupler via an optical fiber and configured to receive at least a portion of the measurement light from the fiber optic coupler; wherein the measurement cavity is characterized by the measurement resonance frequency; a measurement lock-in mechanism in optical communication with the first fiber optical circulator via an optical fiber and configured to send an electrical signal at least to the second source based on at least the measurement resonance frequency; and a reference lock-in mechanism in optical communication with the second fiber optical circulator via an optical fiber and configured to send an electrical signal at least to the first source based on at least the reference resonance frequency; and wherein the pressure of the environment is determined based on the reference resonant frequency and the measurement resonance frequency.

Also disclosed herein are pressure sensors comprising any one or a combination of any of the embodiments of pressure sensors and associated methods disclosed herein. Also disclosed herein are methods for measuring a pressure of an environment comprising any one or a combination of any of the embodiments of pressure sensors and associated methods disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 15A. A schematic top view of the ring resonator based on multiple-slot waveguides. FIGS. 15B and 15C. Scanning electron microscope (SEM) images of a silicon nitride multiple-slot waveguide ring resonator before silicon oxide top cladding deposition.

FIG. 16A is a pressure sensor configuration including co-propagating beams and two polarization modes. In the configuration of FIG. 16A, reference and measurement beams are orthogonally polarized and travel in the same direction (co-propagating, or same propagation mode). The intracavity optics splits the polarizations and one passes through a cell containing the environment (e.g., gas of interest) for measurement. FIG. 16B is a pressure sensor configuration including counter propagating beams (different propagation direction) and two polarization modes. In the configuration of FIG. 16B, reference and measurement beams can be orthogonally polarized and, as in FIG. 16A, the intra-cavity optics include two polarization beam displacers to separate and recombine the beams. FIG. 16C is a pressure sensor configuration including counter propagating beams and having the same (parallel) or similar polarization mode. In the configuration of FIG. 16C, the reference and measurement beams have parallel polarization but are counter-propagating with respect to each other. An arrangement similar to that found in polarization independent isolators should do the job.

DETAILED DESCRIPTION OF THE INVENTION

Figure 1A:
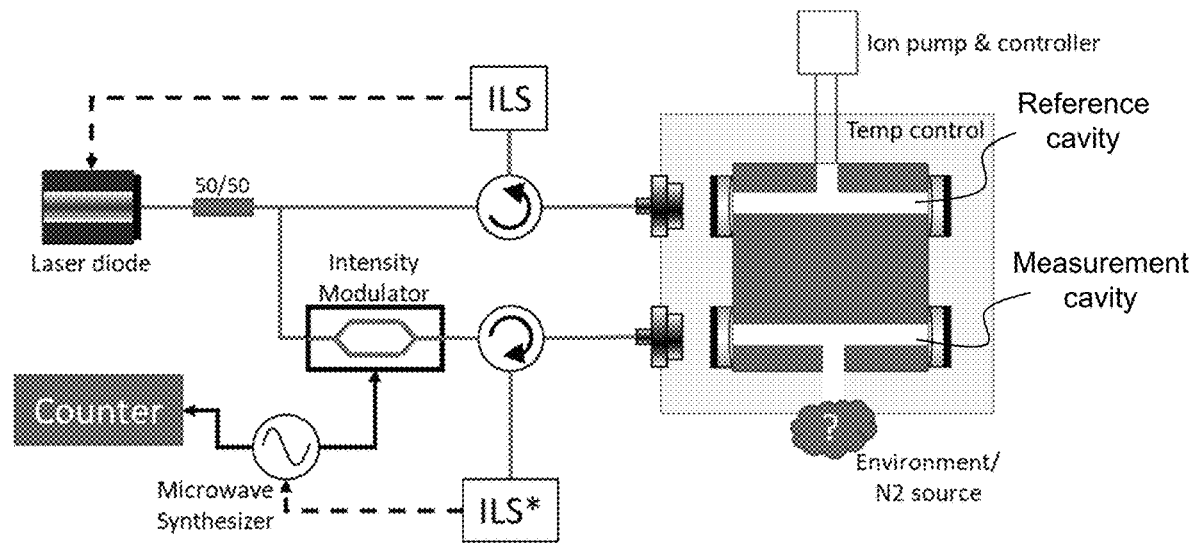
FIG. 1A is a schematic of a pressure sensor, according to certain embodiments disclosed herein.

In general, the terms and phrases used herein have their art-recognized meaning, which can be found by reference to standard texts, journal references and contexts known to those skilled in the art. The following definitions are provided to clarify their specific use in the context of the invention.

The term "substantially" refers to a property or condition that is within 20%, within 10%, within 5%, within 1%, or is equivalent to a reference property or condition. The term "substantially equal," "substantially equivalent," or "substantially unchanged," when used in conjunction with a reference value describing a property or condition, refers to a value or condition that is within 20%, within 10%, within 5%, within 1%, within 0.1%, or optionally is equivalent to the provided reference value or condition. For example, a frequency offset is substantially 5 MHz if the frequency offset is within 20%, within 10%, within 5%, within 1%, or equal to 5 MHz. The term "substantially greater," when used in conjunction with a reference value or condition describing a property or condition, refers to a value that is at least 2%, at least 5%, at least 10%, or at least 20% greater than the provided reference value or condition. For example, a pressure is substantially greater than 1 atm if the pressure is at least 20% greater than, at least 10% greater than, at least 5% greater than, or at least 1% greater than 1 atm. The term "substantially less," when used in conjunction with a reference value or condition describing a property or condition, refers to a value or condition that is at least 2%, at least 5%, at least 10%, or at least 20% less than the provided reference value. For example, a pressure is substantially less than $1 \times 10^{-5}$ Torr if the pressure is at least 20% less than, at least 10% less than, at least 5% less than, or at least 1% less than $1 \times 10^{-5}$ Torr.

In the following description, numerous specific details of the sensors, systems, mechanisms, devices, device components, and methods of the present invention are set forth in order to provide a thorough explanation of the precise nature of the invention. It will be apparent, however, to those of skill in the art that the invention can be practiced without these specific details.

In an aspect, a pressure sensor for determining pressure in an environment comprises: a source for emitting a coherent reference light characterized by a reference light frequency; wherein the coherent reference light is further characterized by at least one phase modulation frequency; an optical splitter for splitting the reference light into at least a first reference light and a second reference light; a first lock-in mechanism configured to send an electrical signal to the source (directly or indirectly) based on a reference resonance frequency; a reference cavity configured to receive at least a portion of the first reference light; wherein the reference cavity is characterized by the reference resonance frequency; and wherein a pressure within an internal volume or in a reference space of the reference cavity is less than or equal to 0.1 mTorr; a modulator configured to receive the second reference light and modulate the second reference light to generate at least a first sideband frequency such that an output of said modulator is a measurement light characterized by at least the first sideband frequency; a frequency synthesizer configured to drive the modulator; a second lock-in mechanism configured to send an electrical signal to the frequency synthesizer (directly or indirectly) based on a measurement resonance frequency; and a measurement cavity configured to receive at least a portion of the measurement light; wherein the measurement cavity is characterized by the measurement resonance frequency; and wherein the pressure of the environment is determined (directly or indirectly) based on the reference resonant frequency and the measurement resonance frequency.

In another aspect, a pressure sensor for determining pressure in an environment comprises: a source for emitting a coherent reference light characterized by a reference light frequency; wherein the coherent reference light is further characterized by at least one phase modulation frequency; a modulator configured to receive the coherent reference light and modulate the coherent reference light to generate at least a first sideband frequency and a second sideband frequency such that an output of said modulator is a modulated light characterized at least the first sideband frequency and the second sideband frequency; a frequency synthesizer configured to drive the modulator; an optical splitter for splitting the modulated light into at least a first reference light and a measurement light; a first lock-in mechanism configured to send an electrical signal to the source (directly or indirectly) based on a reference resonance frequency; a reference cavity configured to receive at least a portion of the first reference light; wherein the reference cavity is characterized by the reference resonance frequency; and wherein a pressure within an internal volume or in a reference space of the reference cavity is less than or equal to 0.1 mTorr; a second lock-in mechanism configured to send an electrical signal to the frequency synthesizer (directly or indirectly) based on a measurement resonance frequency; and a measurement cavity configured to receive at least a portion of the measurement light; wherein the measurement cavity is characterized by the measurement resonance frequency; and wherein the pressure of the environment is determined (directly or indirectly) based on the reference resonant frequency and the measurement resonance frequency.

In some embodiments, the sensor comprises a processing mechanism configured to determine the pressure of the environment (directly or indirectly) based on the reference resonant frequency and the measurement resonance frequency. In some embodiments, the processing mechanism comprising machine readable instructions to determine the pressure of the environment (directly or indirectly) based on the reference resonant frequency and the measurement resonance frequency. In some embodiments, the processing mechanism is in electrical communication with the frequency synthesizer to determine the pressure of the environment. The processing mechanism may comprise machine readable instructions (e.g., software). Optionally, the processing mechanism comprises a processor and memory (e.g., a computer).

In some embodiments, the sensor comprises a frequency counter in electrical communication with the frequency synthesizer; wherein the processing mechanism is in electrical communication with the frequency counter to determine the pressure of the environment.

In some embodiments, the first lock-in mechanism is configured to send the electrical signal (directly or indirectly) to the source based on an interference ("first interference") of the at least one phase modulation frequency and the reference resonance frequency. In some embodiments, the first interference is a first beat note corresponding to the at least one phase modulation frequency and the reference resonance frequency. In some embodiments, the second lock-in mechanism is configured to send the electrical signal to the frequency synthesizer (directly or indirectly) based on an interference ("second interference") of the at least one phase modulation frequency and the measurement resonance frequency. In some embodiments, the second interference is a second beat note corresponding to the at least one phase modulation frequency and the measurement resonance frequency. In some embodiments, the pressure of the environment is determined (directly or indirectly) based on a comparison of the first interference and the second interference.

In some embodiments, the first lock-in mechanism comprises a technique based on the Pound-Drever-Hall technique to lock the reference frequency of the reference light to the reference resonant frequency of the reference cavity; and wherein the second lock-in mechanism comprises a technique based on the Pound-Drever-Hall technique to lock the first sideband frequency of the measurement light to the measurement resonant frequency of the measurement cavity. In some embodiments, the first lock-in mechanism comprises a technique based on the Pound-Drever-Hall technique to lock the first sideband frequency of the first reference light to the reference resonant frequency of the reference cavity; and wherein the second lock-in mechanism comprises a technique based on the Pound-Drever-Hall technique to lock the second sideband frequency of the measurement light to the measurement resonant frequency of the measurement cavity.

In some embodiments, the first lock-in mechanism is configured to send the electrical signal to the source for modulating at least one of the reference light frequency and the phase modulation frequency. In some embodiments, the second lock-in mechanism is configured to send the electrical signal to the frequency synthesizer for modulating at least one of the first sideband frequency and the phase modulation frequency. In some embodiments, the second lock-in mechanism is configured to send the electrical signal to the frequency synthesizer for modulating at least one of the second sideband frequency and the phase modulation frequency.

In some embodiments, the sensor comprises a phase modulator (e.g., error signal modulator) to generate the at least one phase modulation frequency of the reference light. In some embodiments, the error signal modulator is a phase modulator. In some embodiments, the sensor comprises an oscillator for driving the phase modulator. In some embodiments, the at least one phase modulation frequency is generated via modulation of electrical current to source. In some embodiments, the at least one phase modulation frequency is generated via electrical current modulation of the source. In some embodiments, the at least one phase modulation frequency is characterized by a substantially 5 MHz offset from the reference light frequency. In some embodiments, the at least one phase modulation frequency is characterized by an offset from the reference light frequency selected from the range of substantially 1 MHz to substantially 200 MHz. In some embodiments, the sensor comprises an oscillator for driving the phase modulator. In some embodiments, at least one of the first lock-in mechanism and the second lock-in mechanism comprises an error signal generator In some embodiments, the first lock-in mechanism is configured to send the electrical signal to the source indirectly; wherein the first lock-in mechanism is configured to send the electrical signal to a first servo, the first servo being configured to modulate the source. In some embodiments, the second lock-in mechanism is configured to send the electrical signal to the frequency synthesizer indirectly; wherein the second lock-in mechanism is configured to send the electrical signal to a second servo, the second servo being configured to modulate the frequency synthesizer.

In some embodiments, at least one of the first lock-in mechanism and the second lock-in mechanism comprises an oscillator for providing a frequency modulation to the at least one of the first lock-in mechanism and the second lock-in mechanism.

In some embodiments, at least one of the first lock-in mechanism and the second lock-in mechanism comprises an error signal generator.

In some embodiments, the modulator is selected from the group consisting of an intensity modulator, a phase modulator, an electro-optic modulator, a Quadrature Phase Shift Keying modulator, and any combination thereof. In some embodiments, the modulator is selected from the group consisting of an intensity modulator, a phase modulator, an electro-optic modulator, a Quadrature Phase Shift Keying modulator, an acousto-optic modulator, and any combination thereof.

In some embodiments, the frequency synthesizer is selected from the group consisting of a radio-frequency synthesizer, microwave frequency synthesizer, a direct digital synthesizer, and a voltage-controlled oscillator.

In some embodiments, the sensor comprises at least one optical detector configured to optically detect the reference resonance frequency and the measurement resonant frequency. In some embodiments, the sensor comprises at least one optical detector configured to measure a cavity frequency difference, the cavity frequency difference being a difference between the reference resonant frequency and the measurement resonant frequency. In some embodiments, the detection of the reference resonance frequency and the measurement resonant frequency comprises comparing these to a third optical beam of known frequency, such as via use of a frequency comb stabilized to a microwave frequency reference or a laser stabilized to an atomic or molecular line of known frequency. In some embodiments, the sensor comprises an optical combiner to combine a reference cavity light and a measurement cavity light, thereby forming a combined cavity light; wherein the at least one optical detector is configured to optically detect the combined cavity light; wherein the reference cavity light is characterized by the reference resonance frequency and the measurement cavity light is characterized by the measurement resonance frequency. In some embodiments, the sensor comprises a frequency counter in electrical communication with the at least one optical detector and configured to measure a cavity frequency difference, the cavity frequency difference being a difference between the reference resonant frequency and the measurement resonant frequency. In some embodiments, the cavity frequency difference corresponds to a cavity beat frequency corresponding to an interference of the reference resonant frequency and the measurement resonant frequency; the frequency counter being configured to determine the cavity beat frequency. In embodiments, the at least one optical detector is configured to measure the cavity beat frequency (the beat-note). For example, in embodiments, the at least one optical detector is configured to measure the cavity beat frequency (the beat-note) and the frequency counter is configured to measure the cavity frequency difference based on the cavity beat frequency measurement of the at least one optical detector.

In some embodiments, the modulator is configured to suppress the reference light frequency, such that an intensity at the reference frequency in the measurement light is less than an intensity at the reference frequency in the second reference light. In some embodiments, the intensity at the reference frequency in the measurement light is substantially less than or substantially equal to 5% of the intensity at the reference frequency in the second reference light. In some embodiments, the modulator is configured to suppress the reference light frequency, such that an intensity at the reference frequency in the modulated light is less than an intensity at the reference frequency in the reference light. In some embodiments, the intensity at the reference frequency in the modulated light is substantially less than or substantially equal to 5% of the intensity at the reference frequency in the reference light.

In some embodiments, at least a portion of a body of each of the reference cavity and the measurement cavity is exposed to the pressure of the environment.

In some embodiments, the pressure within the internal volume of the reference cavity is substantially less than or substantially equal to $1 \times 10^{-5}$ Torr.

In some embodiments, an offset between the reference frequency and the first sideband frequency is selected from the range of 0.1 MHz to 40 GHz. This offset may comprise at least one free-spectral-range (FSR) of the reference cavity resonance. Further frequency differences can be covered by frequency jumps of 1 FSR. In some embodiments, each of the first sideband frequency and the second sideband frequency is independently characterized by an offset from the reference frequency selected from the range of 0.1 MHz to 40 GHz. This offset may comprise at least one free-spectral-range (FSR) of the reference cavity resonance and/or of the measurement cavity resonance.

In some embodiments, an internal volume of the measurement cavity comprises a gas selected from the group consisting of nitrogen, helium, argon, and any combination thereof; wherein a pressure of the gas is substantially equal to or substantially greater than 1 atm, or optionally selected from the range of substantially 1 atm to substantially 3 atm. Optionally, the pressure of the gas in the internal volume of the measurement cavity is less than 1 atm, such as selected from the range of 1 kPa to 100 kPa. Optionally, the pressure of the gas in the internal volume of the measurement cavity is greater than or equal to 1 kPa, optionally selected from the range of 1 kPa to 1 atm, or preferably in some applications selected from the range of 1 kPa to 3 atm. In some embodiments, an internal volume of the measurement cavity is exposed to the environment and pressure within the internal volume of the measurement cavity is substantially equivalent to the pressure of the environment.

In some embodiments, the source is a diode laser. In some embodiments, the source is characterized by a free running linewidth of less than 1 MHz.

In some embodiments, the pressure sensor is configured to measure pressure selected from the range of 1 kPa to 100 kPa with a precision selected from the range of 3 ppm to 10 ppm.

In some embodiments, the sensor comprises at least one IQ optical hybrid for determining a sign corresponding to the beat frequency, the at least one IQ optical hybrid being in optical communication with the reference cavity and the measurement cavity.

In some embodiments, each of the reference cavity and the measurement cavity independently comprises an optical contact bond between a mirror and a resonant body. In some embodiments, each of the reference cavity and the measurement cavity independently comprises an indium seal, a silicate bond, an optical contact bond, or any combination thereof between a mirror and a resonant body In some embodiments, each of the reference cavity and the measurement cavity independently comprises a resonator body formed substantially of a material having a bulk modulus greater than 70 GPa, greater than 90 GPa, greater than 100 GPa, or optionally greater than 200 GPa. In some embodiments, each of the reference cavity and the measurement cavity independently comprises a resonator body formed of a material selected from the group consisting of sapphire, NEXCERA, AllVar, Invar, and any combination thereof. In some embodiments, each of the reference cavity and the measurement cavity independently comprises a resonator body formed of a material selected from the group consisting of sapphire, ULE, NEXCERA, AllVar, Invar, and any combination thereof. In some embodiments, each of the reference cavity and the measurement cavity is independently characterized by a cavity length selected from the range of substantially 10 mm to substantially 300 mm, optionally dimension therebetween, optionally selected from the range of 10 mm to 50 mm. In some embodiments, the cavity length of each of the reference cavity and the measurement cavity is substantially equal to the cavity length of the other.

In some embodiments, the sensor comprises a metal sponge in a gas feed line that is operably connected to the reference cavity, the measurement cavity, or both.

In some embodiments, the modulator receives the second reference light via an optical fiber. In some embodiments, the modulator receives the reference light via an optical fiber.

In some embodiments, the source and the modulator are in optical communication (directly or indirectly) via at least one optical fiber, the source and the reference cavity are in optical communication (directly or indirectly) via at least one optical fiber, and the modulator and the measurement cavity are in optical communication (directly or indirectly) via at least one optical fiber. In some embodiments, the source, the optical splitter, the first lock-in-mechanism, the reference cavity, the modulator, the second lock-in mechanism, and the measurement cavity are in direct or indirect optical communication with each other via a plurality of optical fibers.

In some embodiments, each of the reference cavity and the measurement cavity is independently characterized by a cavity length that less than or equal to 15±5 mm. In some embodiments, each of the reference cavity and the measurement cavity is independently characterized by a thermal time constant of less than 1000 seconds, optionally less than 500 seconds, optionally less than 100 seconds. In some embodiments, a time between a pressure change and a pressure measurement is less than 100 seconds, optionally less than 50 seconds, optionally less than 20 seconds. In some embodiments, the pressure sensor is characterized by an intermediate total error of less than or equal to 100±20 ppm. In some embodiments, the intermediate total error corresponds to a precision of the pressure measurement. In some embodiments, each of the reference cavity and the measurement cavity is independently characterized by a folded beam path. In some embodiments, the folded beam path is folded at least twice. For example, the folded beam path can be folded twice using two non-transmitting mirrors to produce a Z-shaped beam path. For example, the folded beam path has a 'Z'-shape. For example, the folded beam path includes at least two additional total reflections with respect to an unfolded straight linear path. In some embodiments, each of the measurement cavity and the reference cavity is characterized by a free spectral range of less than or equal to 2.4 GHz or of less than or equal to 200 MHz. For example, the free spectral range is less than or equal to 200 MHz for a pressure sensor including a fiber resonator. For example, the free spectral range (FSR) can depend on the cavity length or light path length in the respective cavity. In some embodiments, the pressure sensor is characterized by a finesse selected from the range of 100 to 200,000, optionally 100 to 50,000, optionally 300 to 50,000, optionally 300 to 200,000, optionally less than 350,000. In some embodiments, the frequency synthesizer drives the modulator at a frequency that is less than or equal to half of the free spectral range, optionally less than or within 20% of half of the free spectral range, of each of the measurement cavity and the reference cavity. In some embodiments, each of the measurement cavity and the reference cavity is characterized by a mode waist radius selected from the range of 50 µm to 500 µm, optionally within 20% of 200 µm. In some embodiments, the reference cavity and the measurement cavity are formed using a resonator body and a plurality of mirrors (reflectors); and wherein the mirrors are characterized by a radius of curvature selected from the range of 1 cm to 1 m, optionally 10 cm to 1 m. For example, for a linear cavity, the mirrors can have a radius of curvature of 10 cm. In some embodiments, the reference cavity and the measurement cavity are formed using a resonator body and a plurality of mirrors (reflectors); and wherein the mirrors are flat. In some embodiments, each of the measurement cavity and the reference cavity is independently a linear cavity, a folded cavity, or a part of a fiber resonator.

In some embodiments, the pressure sensor comprises at least one fiber resonator, the fiber resonator comprising the reference cavity and the measurement cavity and the fiber resonator being characterized by the reference resonant frequency and the measurement resonance frequency, respectively. For example, at least a fraction of light in the measurement cavity and at least a fraction of light in the reference cavity can concurrently occupy the same physical space, but have different light polarization modes or different light propagation (direction) modes with respect to each other. In some embodiments, the reference cavity or the reference resonance frequency corresponds to a reference mode of the fiber resonator and the measurement cavity or the measurement resonance frequency corresponds to a measurement mode of the fiber resonator being. In some embodiments, the reference mode of the fiber resonator and the measurement mode of the fiber resonator are characterized by a different light polarization mode with respect to each other. In some embodiments, the reference mode of the fiber resonator and the measurement mode of the fiber resonator are characterized by a different light propagation mode (or, direction of light propagation) with respect to each other. In some embodiments, at least a fraction of light in the measurement cavity propagates in a direction that is opposite of a direction propagated by at least a fraction of light in the reference cavity. In some embodiments, the fiber resonator comprises a polarization-maintaining optical fiber having at least the reference mode and the measurement mode; wherein the reference mode corresponds to a first light polarization mode of the polarization-maintaining optical fiber and the measurement mode corresponds to a second light polarization mode of the polarization-maintaining optical fiber. In some embodiments, the fiber resonator comprises a multi-mode optical fiber having at least the reference mode and the measurement mode. In some embodiments, the fiber resonator comprises a multi-mode optical fiber having at least the reference mode and the measurement mode; wherein the reference mode corresponds to a first light propagation mode of the multi-mode optical fiber and the measurement mode corresponds to a second light propagation mode of the multi-mode optical fiber. In some embodiments, a portion of the fiber resonator corresponding to a portion of the measurement cavity is open to the environment, such that light associated with the measurement cavity in the fiber resonator is exposed to the environment. In some embodiments, a portion of the fiber resonator corresponding to a portion of the reference cavity is open to the reference space, such that light associated with the reference cavity in the fiber resonator is exposed to the reference space; wherein the reference space is characterized by a pressure less than or equal to 0.1 mTorr. In some embodiments, the pressure sensor comprises stimulated Brillouin scattering in the fiber resonator.

In some embodiments, the pressure sensor comprises a slot-waveguide resonator; wherein the slot-waveguide resonator comprises a reference slot following a reference track and a measurement slot following a measurement track; wherein at least a portion of the reference cavity corresponds to at least a portion of the reference track and wherein at least a portion of the measurement cavity corresponds to at least a portion of the measurement track. In some embodiments, each of the reference slot and the measurement slot is independently characterized by a cross-sectional height selected from the range of 200 to 800 nm and a cross-sectional width selected from the range of 200 nm to 800 nm. In some embodiments, the reference track corresponds to a Brillouin track, the Brillouin track comprising light from a Brillouin laser. In some embodiments, a temperature of the environment or a temperature of a substrate of the slot-waveguide resonator is determined based on the polarization of light in the Brillouin track of the slot-waveguide resonator.

In an aspect, a method for measuring pressure of an environment comprises steps of: introducing the coherent reference light into the reference cavity; providing feedback to the source via the first lock-in mechanism for locking the reference frequency of the reference light to the reference resonant frequency of the reference cavity; generating the first sideband frequency of the measurement light via modulation of the second reference light via the modulator; introducing the measurement light into the measurement cavity; providing feedback to the microwave synthesizer via the second lock-in mechanism for locking the first sideband frequency to the measurement resonant frequency of the measurement cavity; and determining the pressure of the environment (directly or indirectly) based on the reference resonance frequency and the measurement reference frequency.

In an aspect, a method for measuring pressure of an environment comprises steps of: introducing the coherent reference light to the modulator; generating the first sideband frequency and the second sideband frequency of the modulated light via modulation of the reference light via the modulator; splitting the modulated light into a reference light and a measurement light; introducing the first reference light into the reference cavity; providing feedback to the source via the first lock-in mechanism for locking the first sideband frequency of the modulated light to the reference resonant frequency of the reference cavity; introducing the measurement light into the measurement cavity; providing feedback to the microwave synthesizer via the second lock-in mechanism for locking the second sideband frequency of the measurement light to the measurement resonant frequency of the measurement cavity; determining the pressure of the environment (directly or indirectly) based on the reference resonance frequency and the measurement reference frequency.

In some embodiments, prior to the step of determining, the method further comprising combining a reference resonant light from the reference cavity and the measurement resonant light from the measurement cavity to form a combined resonance light; wherein the reference resonant light is characterized by the reference resonant frequency, the measurement resonant light is characterized by the measurement resonance frequency, and the combined resonant light is characterized by a beat frequency corresponding to the combination of the reference resonant frequency and the measurement resonant frequency. In some embodiments, the method comprises optically detecting a combined resonance light. In some embodiments, the step of optically detecting comprises detecting a beat resonance frequency in the combined resonance light; the beat resonance frequency corresponding to a convolution of the reference resonance frequency and the measurement resonance frequency. In some embodiments, the step of determining comprises determining the pressure of the environment (directly or indirectly) based on the beat resonance frequency. In some embodiments, the method comprises phase modulating the reference light to generate the at least one error signal sideband. In some embodiments, the step of determining comprising determining the pressure of the environment (directly or indirectly) based on a comparison of a first beat note and a second beat note; wherein the first beat note corresponds to a convolution of an error signal sideband and the reference cavity frequency; and wherein the second beat note corresponds to a convolution of an error signal sideband and the measurement cavity frequency. In some embodiments, the method further comprises determining a temperature of the environment.

In an aspect, a pressure sensor for determining pressure in an environment comprises: a first source for emitting a coherent reference light characterized by a reference light frequency; a first optical circulator in optical communication with the first source via an optical fiber; a second source for emitting a measurement coherent light characterized by a measurement light frequency; a second optical circulator in optical communication with the second source via an optical fiber; a fiber optic coupler in optical communication with the first optical circulator via an optical fiber and with the second optical circulator via an optical fiber; a reference cavity in optical communication with the fiber optic coupler via an optical fiber and configured to receive at least a portion of the coherent reference light from the fiber optic coupler; wherein the reference cavity is characterized by the reference resonance frequency; and wherein a pressure in a reference space of the reference cavity is less than or equal to 0.1 mTorr; a measurement cavity in optical communication with the fiber optic coupler via an optical fiber and configured to receive at least a portion of the measurement light from the fiber optic coupler; wherein the measurement cavity is characterized by the measurement resonance frequency; a measurement lock-in mechanism in optical communication with the first fiber optical circulator via an optical fiber and configured to send an electrical signal at least to the second source based on at least the measurement resonance frequency; and a reference lock-in mechanism in optical communication with the second fiber optical circulator via an optical fiber and configured to send an electrical signal at least to the first source based on at least the reference resonance frequency; and wherein the pressure of the environment is determined based on the reference resonant frequency and the measurement resonance frequency, optionally the difference between the reference resonant frequency and the measurement resonance frequency. For example, this pressure sensor with optical fibers can be more compact than conventional systems.

In some embodiments, the measurement lock-in mechanism is in electrical communication with a processing mechanism configured to determine the pressure of the environment based on the reference resonant frequency and the measurement resonance frequency, optionally the difference between the reference resonant frequency and the measurement resonance frequency.

In some embodiments, the measurement lock-in mechanism comprises a first optical detector and a first error signal modulator, wherein the first optical detector is in electrical communication with the first error signal modulator and the first error signal modulator is in electrical communication with the second source. In some embodiments, the reference lock-in mechanism comprises a second optical detector and a second error signal modulator, wherein the second optical detector is in electrical communication with the second error signal modulator and the second error signal modulator is in electrical communication with the first source.

In some embodiments, the reference coherent light is characterized by a first at least one phase modulation frequency and wherein the first error signal modulator generates the first at least one phase modulation frequency of the measurement light. In some embodiments, the measurement light is characterized by a second at least one phase modulation frequency and wherein the second error signal modulator generates the second at least one phase modulation frequency of the reference coherent light.

Figure 16A:
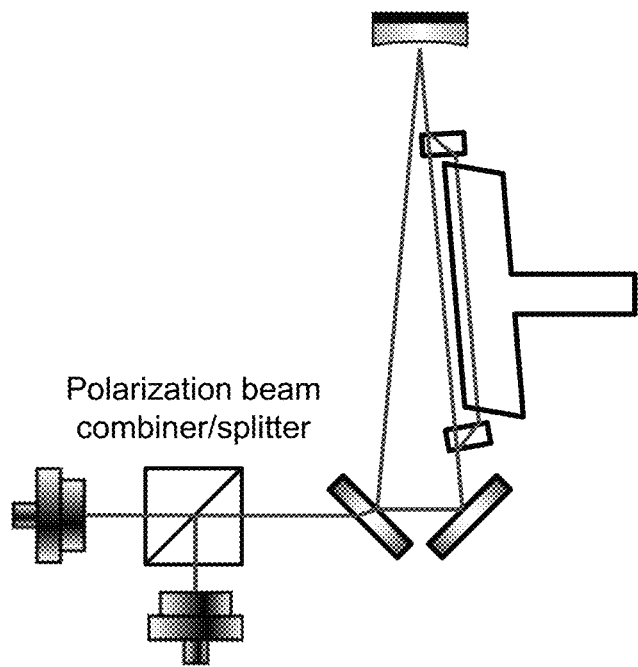
FIGS. 16A-16C. Schematics showing exemplary configurations of select components of pressure sensors, according to certain embodiments of the invention.
Figure 16B:
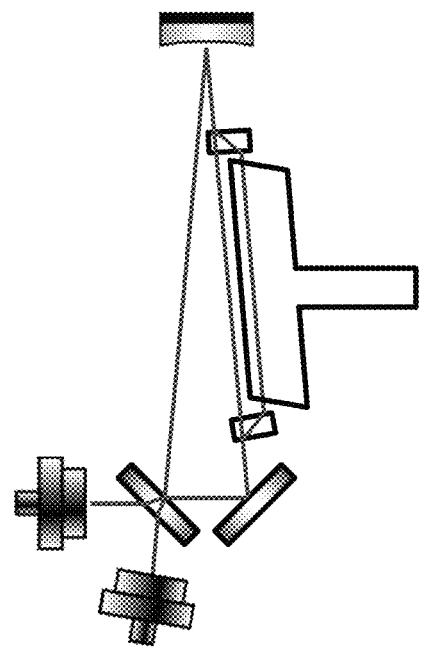
Figure 16C:
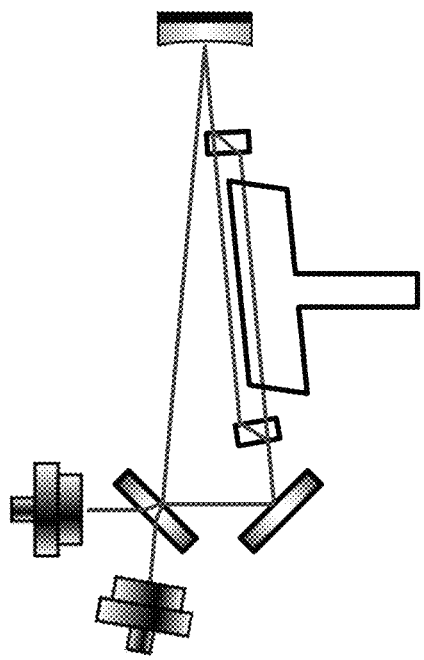

In some embodiments, the reference cavity and the measurement cavity are formed using a resonator body and a plurality of mirrors; and wherein the mirrors are characterized by a radius of curvature selected from the range of 1 cm to 1 m, optionally 10 cm to 1 m. In some embodiments, the pressure sensor comprises at least one fiber resonator, the fiber resonator comprising the reference cavity and the measurement cavity and the fiber resonator being characterized by the reference resonant frequency and the measurement resonance frequency, respectively. In some embodiments, the reference cavity or the reference resonance frequency corresponds to a reference mode of the fiber resonator and the measurement cavity or the measurement resonance frequency corresponds to a measurement mode of the fiber resonator being. In some embodiments, the reference mode of the fiber resonator and the measurement mode of the fiber resonator are characterized by a different light polarization mode with respect to each other. In some embodiments, the reference mode of the fiber resonator and the measurement mode of the fiber resonator are characterized by a different light propagation (direction) mode with respect to each other. In some embodiments, at least a fraction of light in the measurement cavity propagates in a direction that is opposite of a direction propagated by at least a fraction of light in the reference cavity. In some embodiments, the fiber resonator comprises a polarization-maintaining optical fiber having at least the reference mode and the measurement mode; wherein the reference mode corresponds to a first light polarization mode of the polarization-maintaining optical fiber and the measurement mode corresponds to a second light polarization mode of the polarization-maintaining optical fiber. In some embodiments, the fiber resonator comprises a multi-mode optical fiber having at least the reference mode and the measurement mode; wherein the reference mode corresponds to a first light propagation mode of the multi-mode optical fiber and the measurement mode corresponds to a second light propagation mode of the multi-mode optical fiber. In some embodiments, a portion of the fiber resonator corresponding to a portion of the measurement cavity is open to the environment, such that light associated with the measurement cavity in the fiber resonator is exposed to the environment. In some embodiments, a portion of the fiber resonator corresponding to a portion of the reference cavity is open to the reference space, such that light associated with the reference cavity in the fiber resonator is exposed to the reference space; wherein the reference space is characterized by a pressure less than or equal to 0.1 mTorr. In some embodiments, the pressure sensor comprises stimulated Brillouin scattering in the fiber resonator. In some embodiments, the reference cavity and the measurement cavity are in optical communication with at least one beam displacer configured to displace light based on its polarization. In some embodiments, the reference cavity and the measurement cavity are in optical communication with at least one half-wave plate. In some embodiments, each of the at least one beam displacer combines light associated with the reference cavity with light associated with the measurement cavity. See also FIGS. 16A-16B for some exemplary configurations including beam displacer(s).

In some embodiments, the first source is a pump laser.

In some embodiments, each of the reference cavity and the measurement cavity is independently characterized by a thermal time constant of less than 1000 seconds, optionally less than 500 seconds, optionally less than 100 seconds. In some embodiments, a time between a pressure change and a pressure measurement is less than 100 seconds, optionally less than 50 seconds, optionally less than 20 seconds. In some embodiments, the pressure sensor is characterized by an intermediate total error of less than or equal to 100±20 ppm. In some embodiments, the intermediate total error corresponds to a precision of the pressure measurement. In some embodiments, each of the measurement cavity and the reference cavity is characterized by a free spectral range of less than or equal to 2.4 GHz or of less than or equal to 200 MHz. For example, the free spectral range is less than or equal to 200 MHz for a pressure sensor including a fiber resonator. For example, the free spectral range (FSR) can depend on the cavity length or light path length in the respective cavity. In some embodiments, the pressure sensor is characterized by a finesse selected from the range of 100 to 200,000, optionally 100 to 50,000, optionally 300 to 50,000, optionally 300 to 200,000, optionally less than 350,000. In some embodiments, the frequency synthesizer drives the modulator at a frequency that is less than or equal to half of the free spectral range, optionally less than or within 20% of half of the free spectral range, of each of the measurement cavity and the reference cavity. In some embodiments, each of the measurement cavity and the reference cavity is characterized by a mode waist radius selected from the range of 50 μm to 500 μm, optionally within 20% of 200 μm.

The invention can be understood by the following non-limiting examples.

Example 1

Figure 1B:
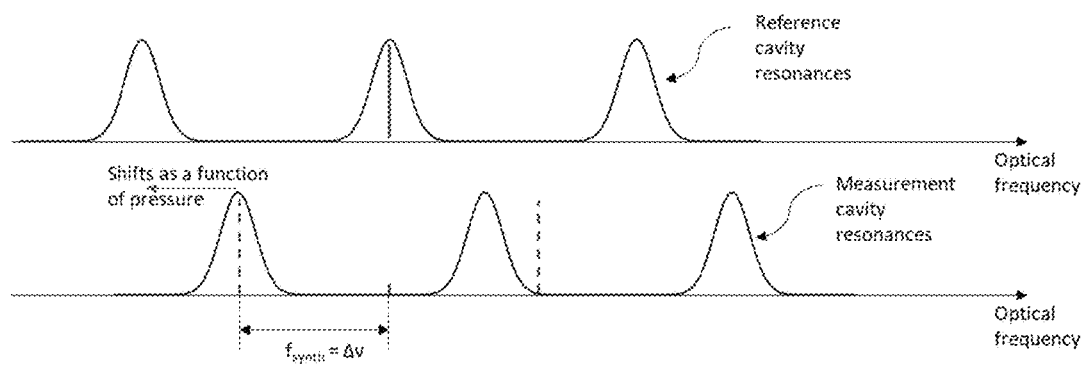
FIG. 1B is a schematic illustrating certain features of the cavity resonances (reference cavity resonance and measurement cavity resonance) and laser frequencies.
Figure 2A:
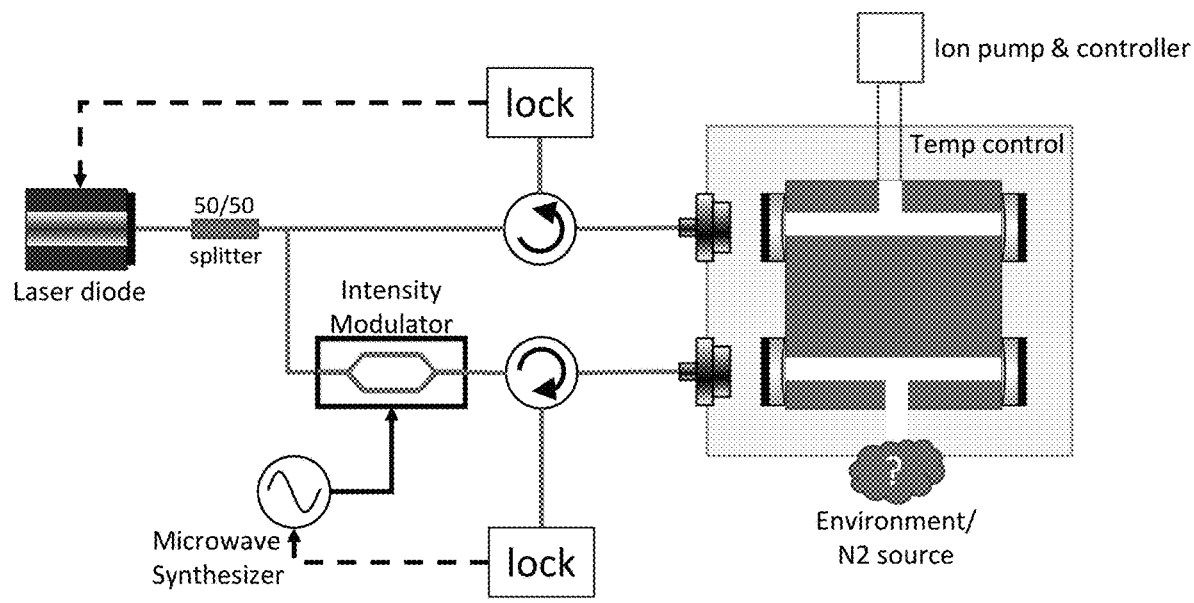
FIG. 2A is a schematic of another pressure sensor, according to certain embodiments disclosed herein.
Figure 2B:
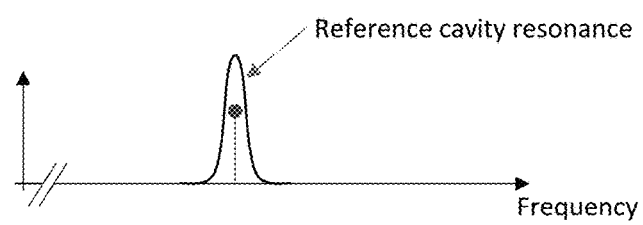
FIG. 2B is a schematic illustrating certain features of the cavity resonances (reference cavity resonance and measurement cavity resonance) and laser frequencies.
Figure 2B:
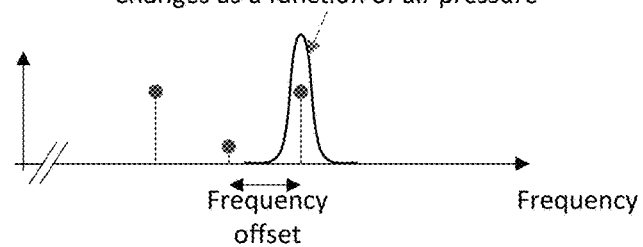
Figure 3A:
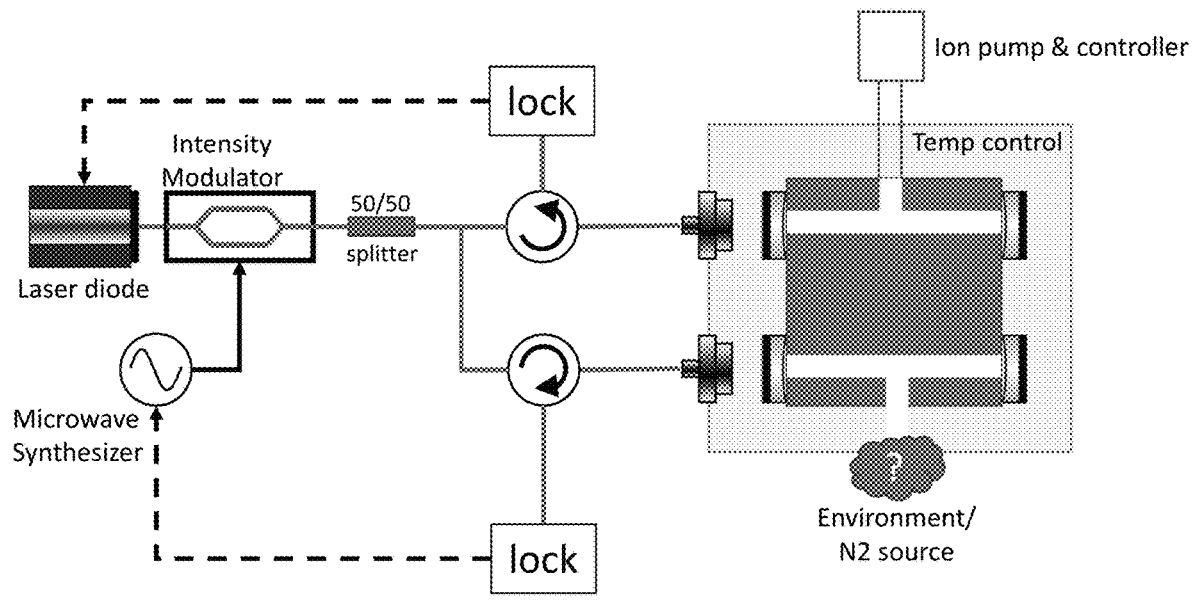
FIG. 3A is a schematic of another pressure sensor, according to certain embodiments disclosed herein.
Figure 3B:
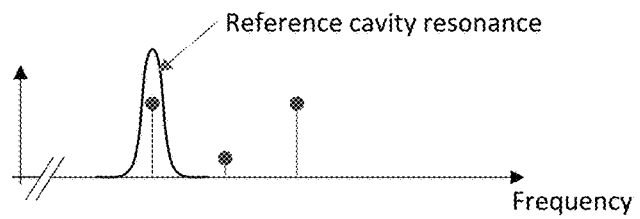
FIG. 3B is a schematic illustrating certain features of the cavity resonances (reference cavity resonance and measurement cavity resonance) and laser frequencies.
Figure 3B:
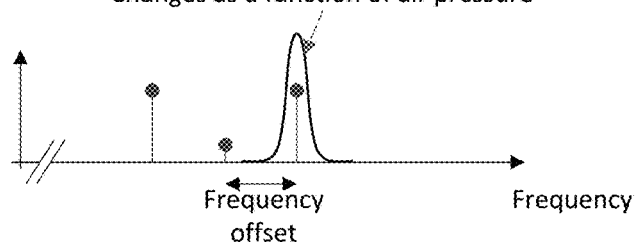
Figure 4:
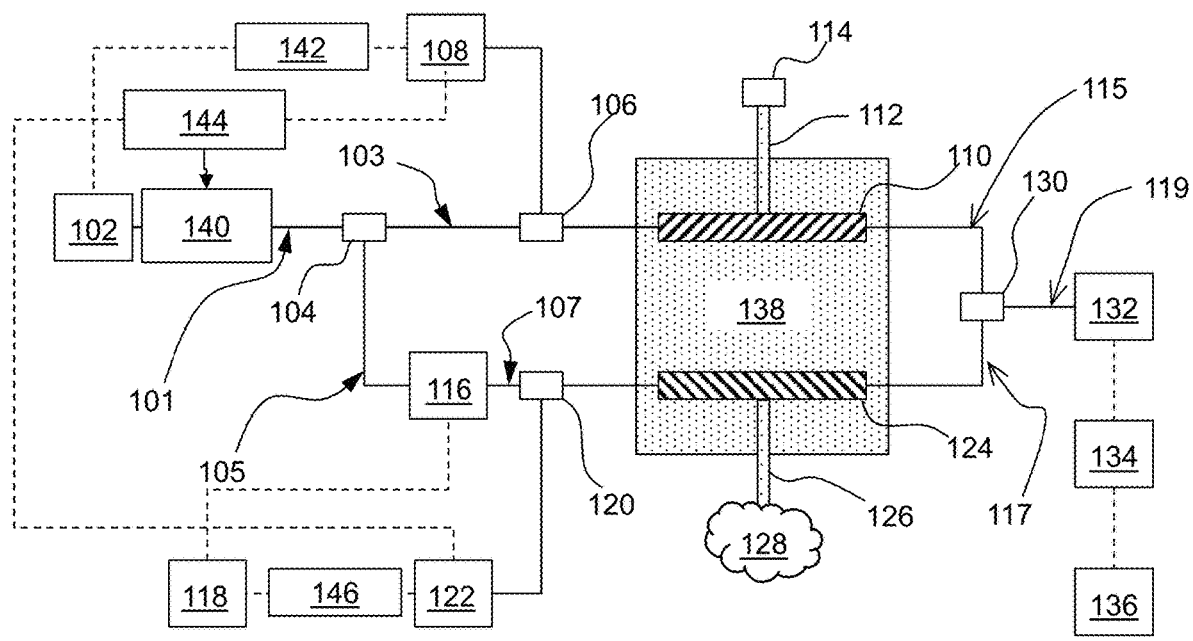
FIGS. 4-7. Each of FIGS. 4-7 is independently a schematic of a pressure sensor for determining pressure in an environment, according to certain embodiments.
Figure 5:
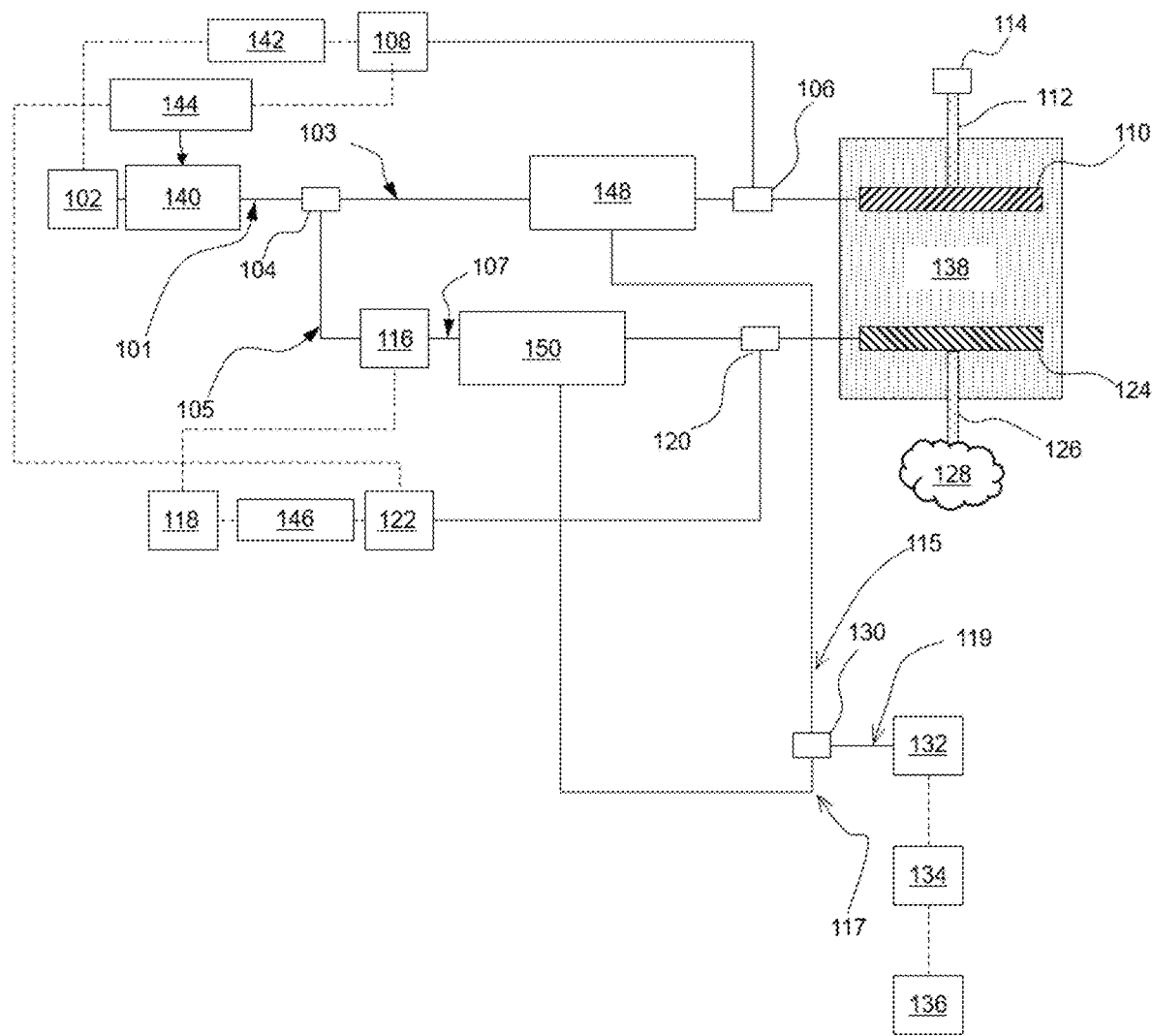
Figure 6:
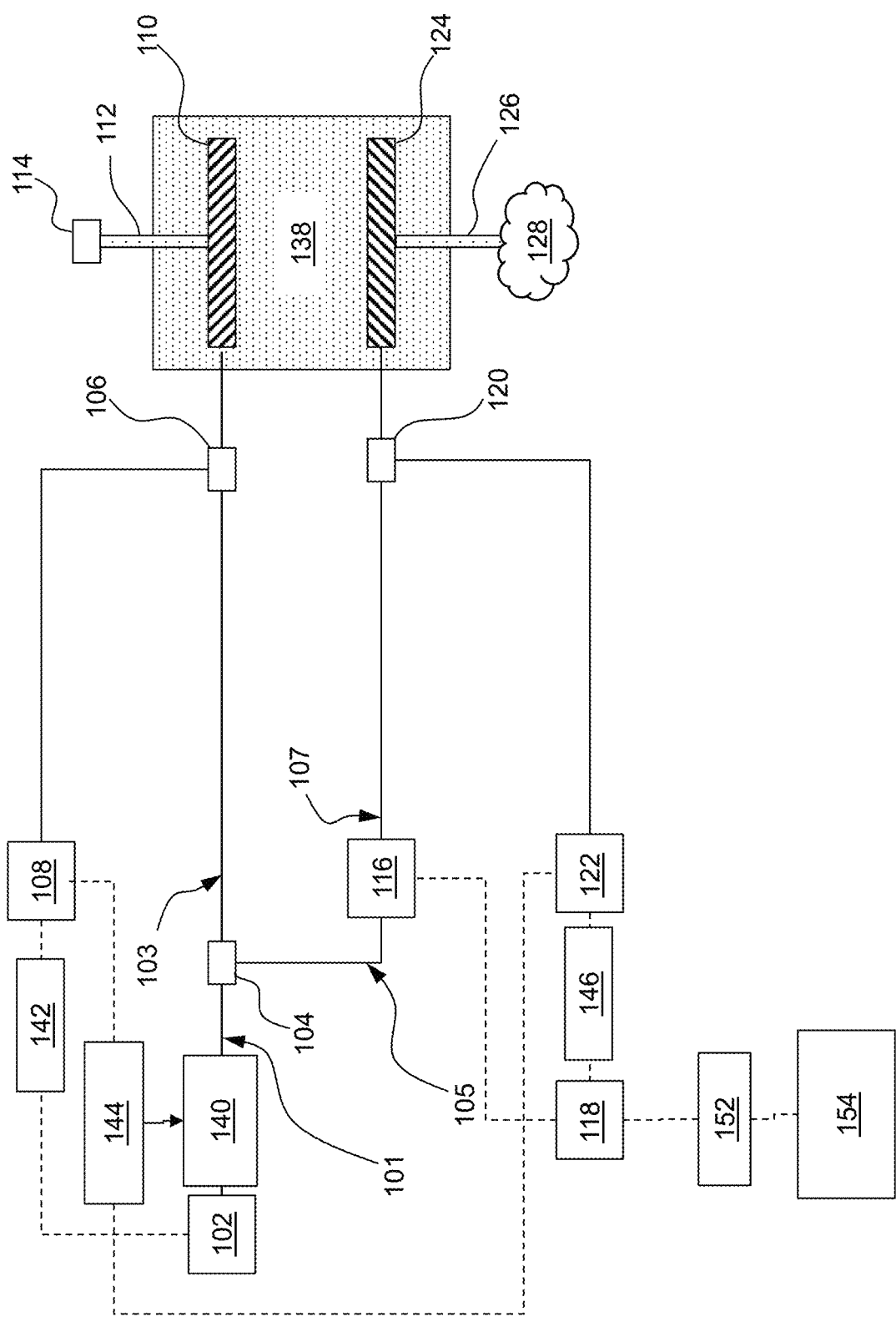
Figure 7:
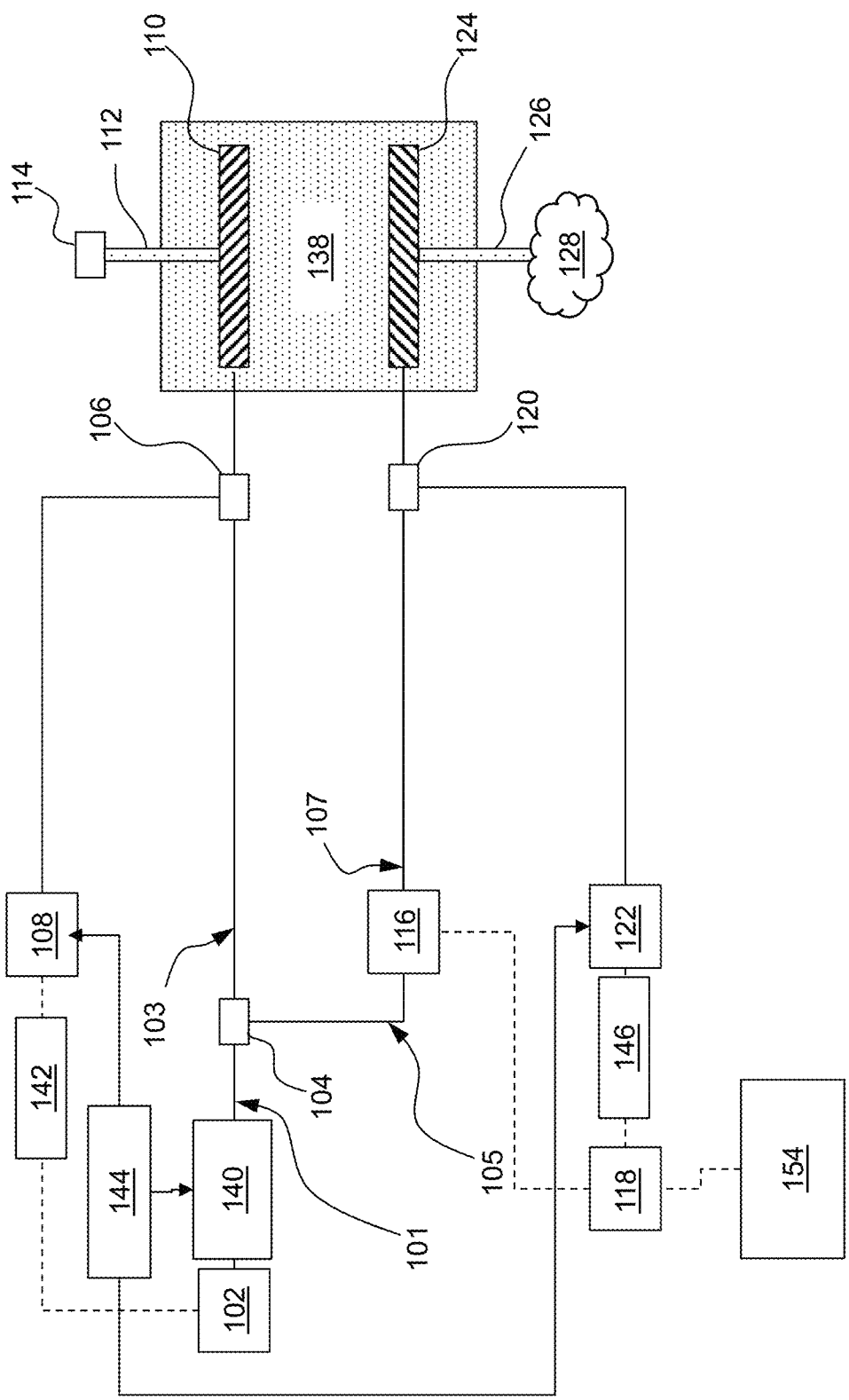
Figure 8:
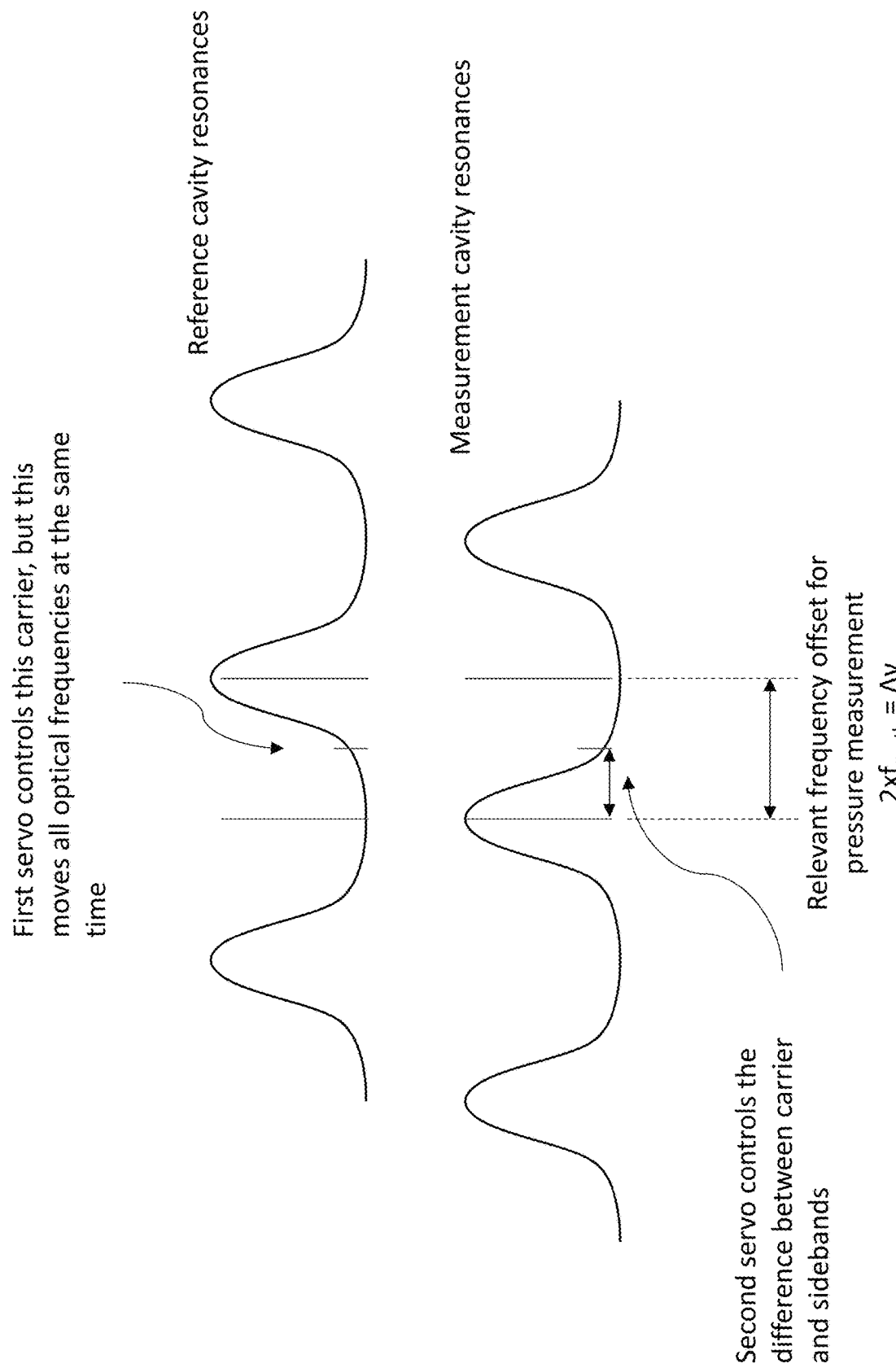
FIG. 8. A schematic illustrating certain features of the reference cavity resonances and the measurement cavity resonances, according to certain embodiments.
Figure 9:
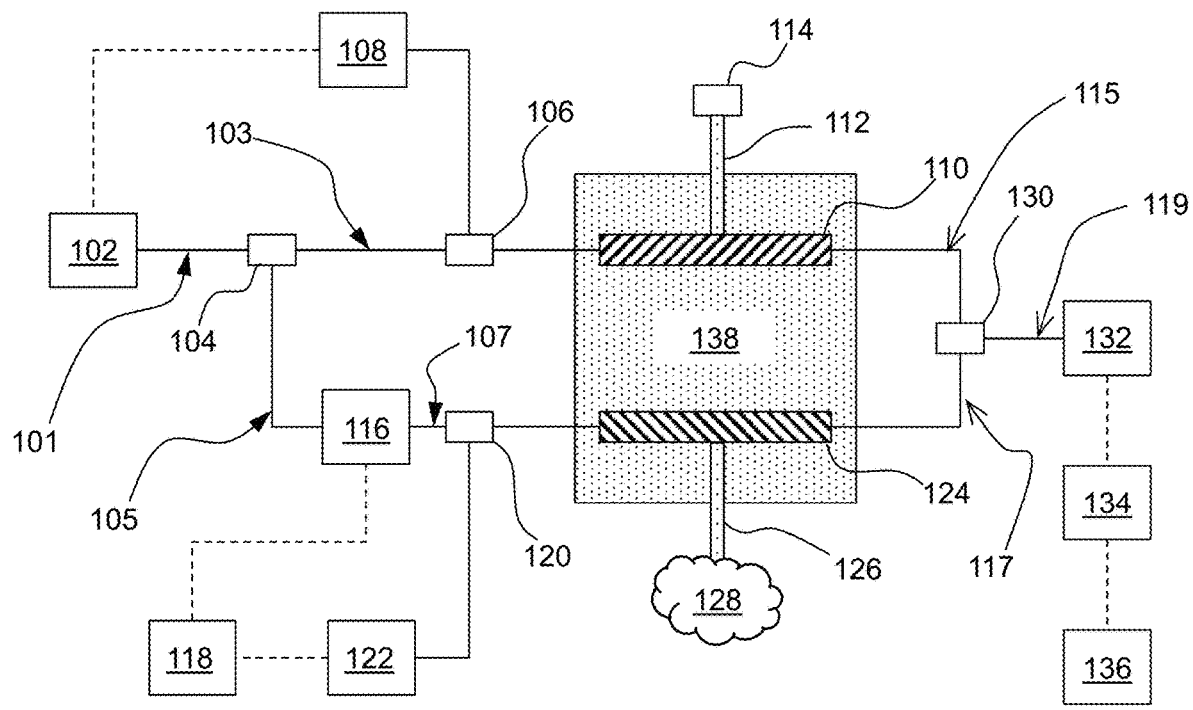
FIGS. 9-12. Each of FIGS. 9-12 is independently a schematic of a pressure sensor for determining pressure in an environment, according to certain embodiments.
Figure 10:
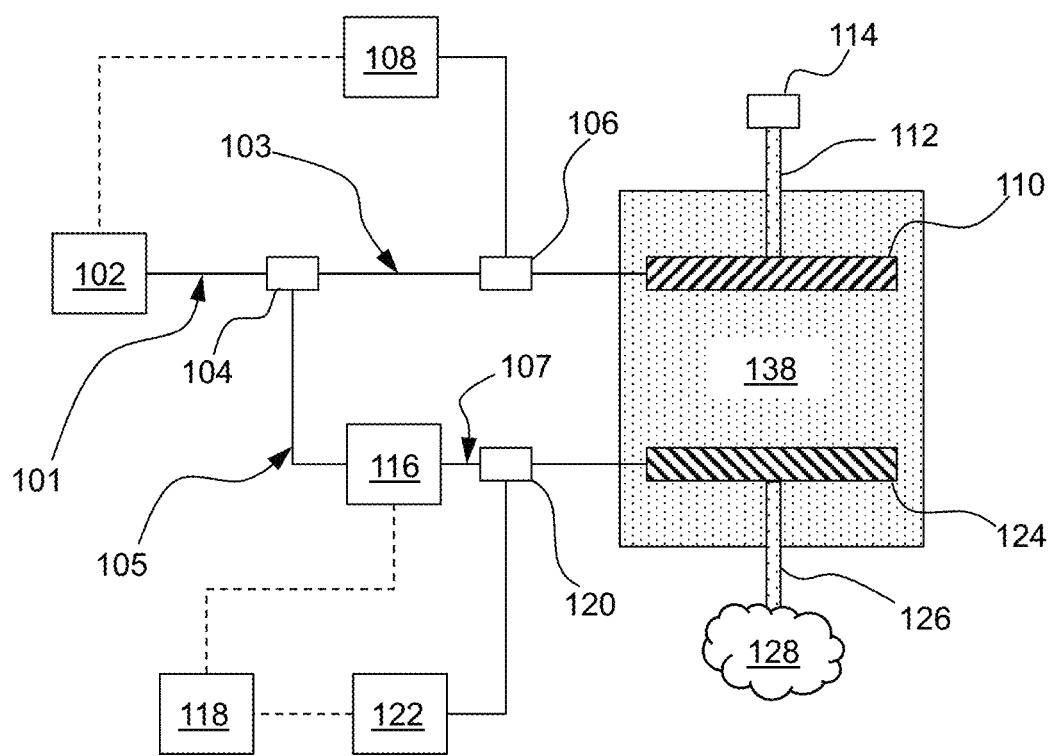
Figure 11:
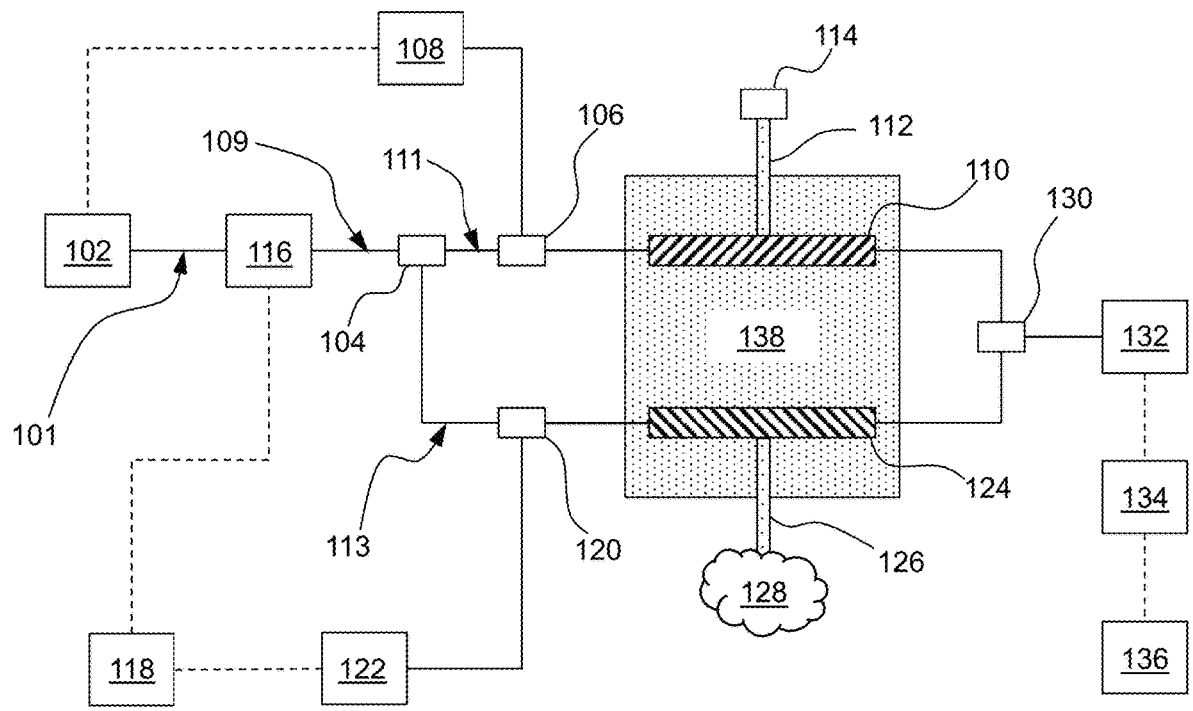
Figure 12:
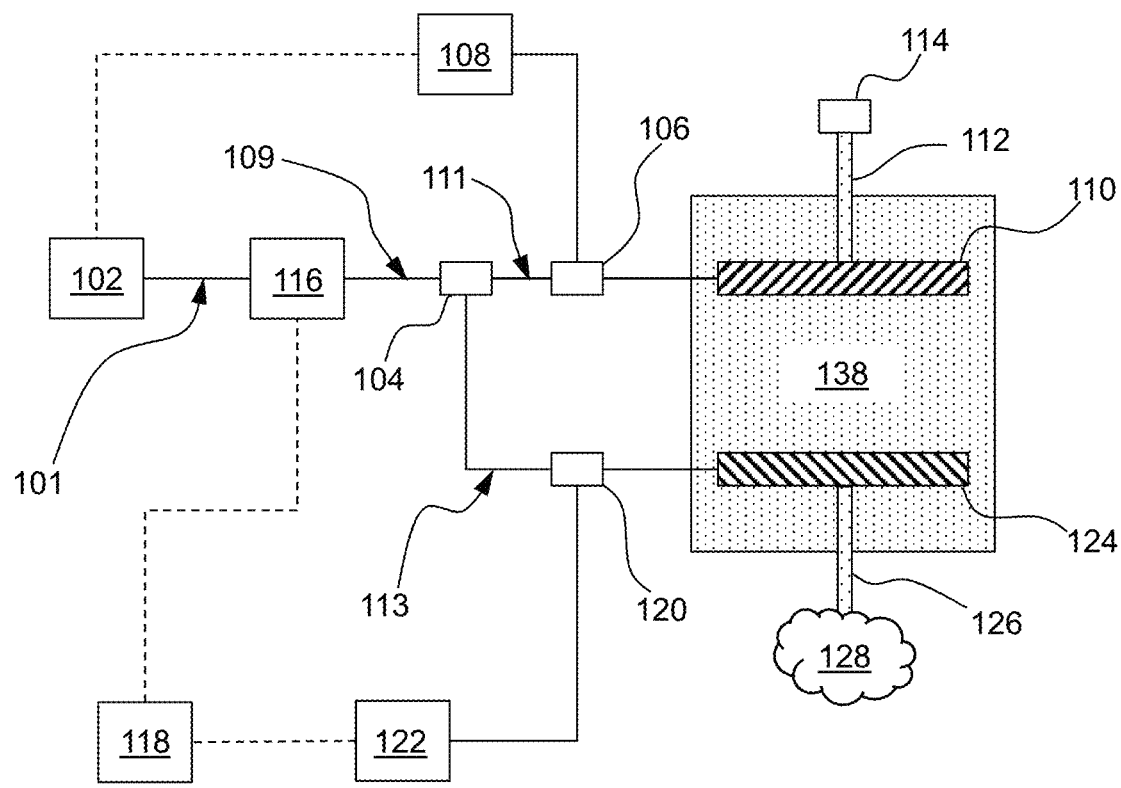

FIG. 1A is a schematic of a pressure sensor, according to certain embodiments disclosed herein. In FIG. 1A, each of "ILS" and "ILS*" independently refers to an "integrated laser system." In some embodiments, the terms "ILS" or "integrated laser system" may be used interchangeably with the term "lock-in mechanism," and vice versa. Each one of the ILSs performs signal demodulation and servo feedback to keep the laser frequency locked to the respective cavity resonance. The ILS for the measurement cavity has been modified to be phase-locked to the ILS for the reference cavity, allowing it to demodulate the Pound-Drever-Hall (PDH) sidebands with the appropriate phase. FIG. 1B is a schematic illustrating certain features of the cavity resonances (reference cavity resonance and measurement cavity resonance) and laser frequencies.

Described in this example is a photonic pressure sensor, according to certain embodiments, that provides a various advantages with respect to the sensor described Egan, et al. (Egan, Patrick F., Jack A. Stone, Jay H. Hendricks, Jacob E. Ricker, Gregory E. Scace, and Gregory F. Strouse. "Performance of a dual Fabry-Perot cavity refractometer." Optics letters 40, no. 17 (2015): 3945-3948), which is incorporated herein by reference to the extent not inconsistent herewith. The pressure sensor relies on the change in refractive index as a function of pressure. The index change causes an optical path length change, leading to a shift of the resonant frequency of a cavity formed by two mirrors attached to an ultra-low expansion glass (ULE) spacer. In Egan, et al., two optical cavities are formed in a common ULE spacer. One by drilling a bore through the spacer and attaching mirrors to the spacer. The other cavity is formed by drilling a channel which is ultimately exposed to the environmental conditions outside the spacer. Mirrors are also attached to form this cavity. A laser can be locked to each of these cavities. The most common method for locking a laser to a cavity resonance is known as Pound-Drever-Hall locking, which is further described in Black (Black, Eric D. "An introduction to Pound-Drever-Hall laser frequency stabilization." American Journal of Physics 69, no. 1 (2001): 79-87), which is incorporated herein by reference to the extent not inconsistent herewith.

Several advantages are achieved herein over the implementation in Egan, et al. by using laser modulation techniques allowing us to produce a sensor with smaller footprint, weight, power consumption as well as lower cost and system complexity. First, instead of using bulky gas lasers as in Egan, et al., we use a diode laser significantly reducing the power consumption and the footprint of the system. Second, instead of detecting a beat-note between two lasers locked to each the reference and measurement cavities, we split a portion off the diode laser and use an electro-optic modulator to generate a sideband which is subsequently locked to the measurement cavity. The advantage of doing this is at least two-fold: 1) it halves the laser count in the system and, 2) it obviates the need to detect a beat frequency between the two lasers since the sideband offset frequency is given by the synthesizer frequency. In some embodiments, an off-the-shelf frequency synthesizer is used and a small fraction of the power is split off before driving the modulator and measured using a frequency counter. This gives a straightforward, high signal-to-noise ratio signal to count—something which isn't always straightforward to obtain from an optical beat-note. In some embodiments, the synthesizer may be replaced for a direct digital synthesizer (DDS) which may further simplify the setup by obviating the need for a frequency counter, as the digital tuning word for the synthesizer directly gives a reading of the frequency offset.

One challenge is that one must determine whether it is the upper sideband or the lower sideband which is locked to the measurement cavity. This challenge also exists in the implementation in Egan, et al., in the form of a beat-note sign determination. The second challenge is particular to the sideband locking case and it arises when the offset frequency is equal to one-half of the free-spectral range of the measurement cavity in that case both sidebands become resonant with separate cavity resonances, causing signal interference. These challenges can be addressed via any one or more of the following embodiments:

1) an acousto-optic modulator can be inserted in the measurement arm. By introducing a small shift with known sign, the change in the synthesizer frequency to maintain the lock will disambiguate whether it is the upper or lower sideband which is locked to the measurement cavity. Also, the introduction of a frequency shift eliminates the second problem by effectively shifting the carrier away.

2) The intensity modulator can be replaced for a quadrature phase-shift keying (QPSK) modulator, which can allow one to generate a single-sideband with carrier suppressed, effectively eliminating both problems. An apparent problem that may arise when the measurement and reference resonances overlap is addressed by keeping the offset frequency >1 FSR away.

3) The intensity modulator can be replaced by a phase modulator and the optical frequency shift can be directly generated by the DDS by summing a serrodyne function to the sideband-generating function. The sign can then be determined as in point 1). The introduction of serrodyne modulation can also solve the second challenge in the same way as 1).

4) If a beat-note is being detected, an optical IQ hybrid can be used to determine the sign. This embodiment can be combined with one or more of the above embodiments to solve the second challenge.

Examples 2-11

The pressure sensors, and associated methods, described in these examples provide various advantages over conventional systems such as those described in Egan, et al. and in Hendricks, et al. (U.S. Pat. No. 9,719,878), which is incorporated herein by reference to the extent not inconsistent herewith.

The sensors described herein can be useful as a transfer standard because the measurement accuracy can be largely derived from the atomic properties of nitrogen. This method is also useful for precise measurements of pressure, such as in the 10 kPa range, where conventional sensors are wanting.

The pressure sensors, and associated methods, described herein may be referred to as dual Fabry-Perot (FP) photonic pressure sensors. Generally, these sensors compare the resonant frequencies between two medium-finesse FP cavities: a reference cavity with its beam path evacuated to vacuum pressure, and a second test cavity with its beam path filled with nitrogen at the pressure to be measured. The frequencies of two lasers are referenced to the effective lengths of the two cavities with precision servo locking to the same or similar mode order (number of wavelengths in a round trip of the cavity). Any change in the pressure of the test cavity gas changes the gas's refractive index, and correspondingly the effective length and hence the frequency of the laser locked to it. The frequency of the reference laser remains unchanged, to first order. As a result, the beat frequency between the two lasers is a readout of the differential gas pressure, when correction terms are applied to account for non-ideal gas behavior and cavity distortion. In some embodiments, the sensors described herein are field-ready, portable, transportable, and robust without sacrificing performance.

In some embodiments, the sensors described herein provide ultra-high precision (3 ppm to 10 ppm) and traceable pressure measurements in a portable, cost-effective package.

In some embodiments, the sensors are characterized by reduced SWaP-C with respect to conventional approaches (e.g., Egan, et al.) for robust operation in a field environment.

Example 2

Certain conventional systems use two He-Ne lasers. These lasers are costly and bulky and have limited lifetime. In contrast, according to some embodiments, the systems described herein use two semiconductor lasers or one semiconductor laser and an advanced modulation scheme. Semiconductor lasers are compact, power efficient, and inexpensive. They have a predictable frequency tuning curve as a function of temperature and current. Using commercially available temperature and current control, the laser frequency can be predicted to <1 GHz. This allows knowledge of the mode difference number in combination with coarse pressure gauge data. The particular diode laser type to be used will be a crucial part of this device. Diode lasers have the advantage of being inexpensive and tunable in frequency (through changing the diode bias current or device temperature. The critical parameter is the free running linewidth (preferred <1 MHz), and the Fourier frequency at which the response is 90 degrees delayed in phase from an applied modulation frequency. This latter quantity determines to what extent electronic feedback can control the linewidth of the laser under servo control. The laser unit price is also a consideration for some of the devices envisioned. Some lasers have a strong frequency selection device (Bragg reflector), for example RIO. These lasers have free running linewidths of ~25 kHz, though may exhibit non-smooth frequency tuning over GHz of frequency range. The price is at the $5 k level, which is acceptable for a high-end transfer pressure standard though not a device for process pressure measurement. SLS is characterizing Denselight laser sources, which are inexpensive and have a linewidth of ~100 kHz. NEL lasers are inexpensive, though the cavity resonance with would have to be >=1 MHz for effective locking.

Example 3

According to some embodiments, the systems described herein use advanced modulation schemes to use a single laser to interrogate both cavities. This also simplifies the beat frequency measurement, compared to using two lasers, as the beat frequency can be determined by applied modulation frequency (e.g., tuning word in DDS) rather than using GHz-bandwidth detectors and divider electronics to bring the beat signal to a frequency that can be digitized.

Example 4

Certain conventional approaches use a third absolute frequency reference to determine the sign of the beat frequency between the reference and measurement lasers. In contrast, according to some embodiments, the systems described herein use of IQ optical hybrids to determine the sign of the beat-note (or, cavity beat frequency). Alternatively, we could use a phase of dither applied to one laser as means to determine sign of beat-note.

Example 5

Certain conventional systems use mirrors that are bonded using a silicate bonding process, and this process has been shown to produce inconsistent bonding creeps. For example, this can lead to non-common mode frequency drift of the reference and measurement cavities—degrading uncertainty of the sensor. In contrast, according to some embodiments, the systems described herein use optical contacting for bonding with reduced contact drift.

Example 6

Some conventional systems (e.g., Egan, et al.) use a settling time of ~90 minutes. In contrast, according to some embodiments, the systems described herein include improved thermal properties of the cavity components (e.g., resonant body, spacer) that lead to shorter settling times for continuous measurements.

Example 7

Certain conventional systems use a ULE spacer in the cavity, which has a bulk modulus of 70 GPa. The bulk modulus determines the amount of deformation endured by the cavity when brought up to pressure. In contrast, according to some embodiments, the systems described herein use larger bulk modulus materials, such as but not limited to, Sapphire, NEXCERA or AllVar, for reduced deformation coefficients. Table 1 compares properties of certain materials.

TABLE 1

| Property | ULE | Sapphire | NEXCERA |
|---|---|---|---|
| CTE | $<10^{-10}$ K$^{-1}$ (slope: $1.1 \times 10^{-9}$ K$^{-2}$) | 9e-6 | $<10^{-10}$ K$^{-1}$ (slope $4.9 \times 10^{-9}$ K$^{-2}$) |
| Young's modulus | 68 GPa | 345 GPa | 130 GPa |
| Bulk modulus | 34 GPa | 241 GPa | |

Example 8

Certain conventional systems use a 150 mm long cavity. In contrast, according to some embodiments, the systems described herein use smaller cavity lengths to reduce cost and improve portability. This may conventionally lead to the problem of having to count higher beat frequencies. However, the sensors and methods described here having advanced modulation schemes simplify the frequency measurement process significantly (specifically is a DDS is used to generate the laser to interrogate the measurement cavity). In some embodiments, 50 mm cavities are used. This has the added benefit of reducing the mode number difference that needs to be tracked in a large dynamic range measurement.

Example 9

Certain conventional systems, require filling the sample gas directly to an evacuated chamber for each measurement. This leads to a large amount of enthalpy heat released onto the cavity spacer which has to be thermalized over the 90 minutes stated above. In contrast, according to some embodiments, the systems described herein use a metal sponge in the feed line to pre-condition the sample and absorb the enthalpy energy from the free expansion of the fill gas in to the low-pressure chamber volume.

Example 10

According to some embodiments, the sensors described herein use a pliable vacuum seal to keep the reference cavity evacuated. An Indium seal can be used to better preserve the cavity dimensional stability.

Example 11

Certain conventional systems rely on free-space optics to couple into cavity, which makes it an instrument for the laboratory environment. In contrast, according to some embodiments, the systems described herein use mostly fiber-optic components to improve the instrument's portability and robustness. Additionally, hybrid isolators and splitters to reduce the size and cost of the final instrument. Mode-matching optics from fiber to cavity can be integrated/glued to the vacuum housing. Alignment can be done quickly with high-efficiency coupling to TEM00. This assembly has been shown to be robust in commercial transport and to operate in field environments.

Additional Examples

Each of FIGS. 2-7 and 9-12 is independently a schematic corresponding to an exemplary pressure sensor, according to certain embodiments of the invention. Solid and dashed lines represent communication between components connected by said lines. Generally, though not necessarily, the solid lines represent optical communication (or, optical coupling) between components, such as via optical fiber through which light passes. Generally, though not necessarily, the dashed lines represent electrical communication, which allows for transfer of electrical signals between the connected components. Each of the exemplary pressure sensors of FIGS. 2-7 and 9-12 independently comprises one or more of the following components or features: a source of light (e.g., laser diode) 102; a beam splitter 104; a beam splitter 106; a first lock-in mechanism 108, which in some embodiments is or comprises an error signal generator by coherent demodulation (PDH error signal), and which can, in some embodiments, comprise a servo and/or an oscillator; a reference cavity 110; a gas or vacuum line 112; a pump 114; a modulator 116, which in some embodiments is an intensity modulator, a phase modulator, a QPSK modulator, and/or an electro-optic modulator; a frequency synthesizer 118, which in some embodiments is a radio frequency synthesizer or a direct digital synthesizer; an optical circulator 120; a second lock-in mechanism 122, which in some embodiments is an error signal generator by coherent demodulation (PDH error signal); a measurement cavity 124; a gas feed line 126; a gas source or environment 128; an optical combiner 130; an optical detector 132; a frequency counter 134; a processing system 136; a block, body, or support for at least one cavity 138; a phase modulator 140; a servo 142; an oscillator 144; a servo 146; an optical coupler or a beam splitter 148; an optical coupler or a beam splitter 150; a frequency counter 152; and a processing mechanism 154. Optionally, optical communication paths (represented by certain lines) are identified as comprising one or more of the following light (or, optical signals): a coherent reference light 101, which is phase modulated in some embodiments; a first reference light 103; a second reference light 105; a measurement light 107; a reference resonance light 115; a measurement resonance light 117; and a combined resonance light 119. A lock-in mechanism (e.g., 108 and/or 122) can optionally comprise an optical detector. It is also noted that additional description of certain exemplary optical cavities, their components, and other components, and methods of forming any of these, may be described in, for example, Notcutt, et al. (US Pat. No. 1,0141,712), Plusquellic, et al. (U.S. Pat. No. 8,642,982), and Silander, et al. [Silander, Isak, Martin Zelan, Ove Axner, Fredrik Arrhén, Leslie Pendrill, and Aleksandra Foltynowicz. "Optical measurement of the gas number density in a Fabry-Perot cavity." Measurement Science and Technology 24, no. 10 (2013): 105207.], all of which are incorporated herein by reference to the extent not inconsistent herewith, as well as in Hendricks, et al. and Egan, et al.

Example 12: Making Dual Fabry-Perot Pressure Sensors Inexpensive and for Wide Application NIST developed a dual Fabry-Perot (FP) cavity pressure sensing device (acronym FLOC=fixed length optical cavity) with many advantages over some previous technologies [1,2]. In this Example, the presently disclosed dual Fabry-Perot cavity pressure sensing technology, according to some embodiments, is less costly to manufacture, and smaller in physical size than previous devices. The smaller sensors of this Example are designed towards thermal time constants of tens of seconds and can have intermediate total error values (say 100 ppm).

Pressure sensing is a >$8 bn dollar market with remarkable breadth, from aviation to process control. These dual FP pressure sensors are likely to start at the precision, high price-point end of the market, for example, a transfer standard for calibration. How their application diffuses from this end of the market and where their niche may be will depend to some extent on how low cost they can be made. An example is accurate pressure measurement for cavity ring-down spectrometers.

For example, the sensors disclosed here, according to certain embodiments, include medium finesse Fabry-Perot cavities. The wide deployment of fiber optics has made FP optical filters widespread, though the ITU grid has separations at the 50 GHz level. The level of precision of these sensors disclosed here, according to certain embodiments, can be MHz or less. This is a step forward for optical sensing and enables deployment of further sensing technologies. The use of a laser locked to a micro-optic FP cavity optical assembly is a push into new territory for the way FPs are built and sensors are made.

These pressure sensors can be moved to photonic integrated chip (PIC) platforms. This is the way forward for optical sensors where cost is the paramount driver, for example in laser radar in cars. PIC technology is also the thrust of some DARPA programs, and some of the most successful PIC devices developed to date are Brillouin lasers. A problem in a PIC approach is that it is difficult to have an approximately zero thermal expansion coefficient reference cavity in vacuum, which is part of the existing NIST FLOC approach. It is also difficult to have a fully free-space cavity for sensing the gas. For the reference cavity, the challenge is work around the temperature dependence of $dn/dT \sim 10^{-5}$ $K^{-1}$. This is some four orders of magnitude larger than the thermal expansion coefficient of Corning 7973 ultra-low expansion (ULE) glass, which can be as low as $10^{-9}$ $K^{-1}$. The second challenge is to decouple the sense cavity from the waveguide, to allow the light to sufficiently feel the refractive index of the gas to be measured. These challenges are addressed by the pressure sensors disclosed here, according to certain embodiments, thereby providing for precision pressure sensors with low size, weight, power and cost that are made with a semiconductor process.

Some challenges, constraints, or technical questions considered and/or addressed in this Example include: The creep of such a structure. Decrease in curved mirror size while still optically contacting at the annulus. Size vs complexity, given the constraints that the speed of the electronics should remain in the few GHz range. Using silicate/hydroxide bonded joints that are thin enough that bond-length creep is acceptably small, which helps remove requirement for polishing the surfaces for optical contact, reducing cost and allowing smaller curved mirrors to be used (as no polished annulus is required). Use of a getter pump or novel small ion pump. Temperature and ramp profiles are considered for baking the cavity to get rid of volatiles to reduce loading on the pump.

Some pressure sensors disclosed here use a fiber ring cavity using a four port circulator to introduce the two short, independent paths where the sample and reference would be located. See for example FIG. 17. Some pressure sensors disclosed here use a Brillouin laser approach would improve the sensor performance. Some pressure sensors disclosed here use integrated optics sensor. Some pressure sensors disclosed here use counter-propagating beams in the fiber case.

Figure 13:
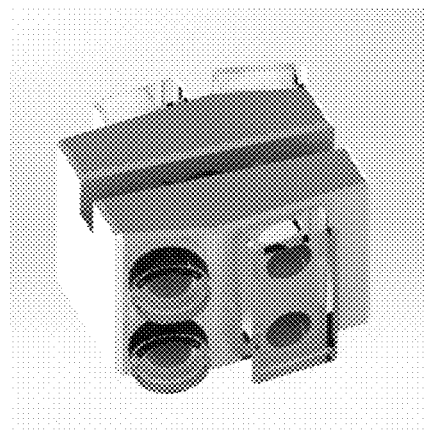
FIG. 13. A schematic of a small version of a FLOC, as a test of principle. The dimensions can be ~15 mm on a side. The beam is folded to give a free spectral range of ~3 GHz, for example.

Some pressure sensors disclosed here use miniature conventional cavities, such as shown in FIG. 13.

The benefits of shrinking the cavity include: the material costs decrease, the volume of the instrument decreases; thermal time constants decrease, and temperature gradients decrease. What becomes more difficult in the shrinking process is: The free spectral range FSR=c/2L increases, possibly to >6 GHz. This makes signal electronics exotic, complex, costly, and power hungry; If optical contacting is to be used to bond the mirrors, then polishing an annulus on a mirror of small diameter becomes difficult.

The cavity configuration of FIG. 13 has a folded beam path, to keep the FSR and the signal electronics to a manageable frequency. Some pressure sensors disclosed here use direct digital synthesis (DDS) frequencies of 1.2 GHz at the moment. This 1.2 GHz can be half a free spectral range. With an FSR of 2.4 GHz, and with a beam that is folded twice, this would give a cavity length or a cavity spacer edge length of ~15 mm. There is an increase in complexity through the number of surfaces that are polished, two different optical coatings are needed, additional optical contacts, and machining tolerances, though all of these are routine in optical fabrication. A folded cavity has distinct non-degenerate modes for S and P polarizations, so one can couple into the cavity using only one polarization (S).

Some pressure sensors disclosed here use optical contacting to bond the mirrors to the spacer. Many FP cavities use this (some with $5\times10^{-17}$ fractional stability at 1 s), and laser gyros use this (including the bond as a vacuum seal). Optical contacting of curved mirrors requires a flat annulus polished at the rim. This annulus can be a few mm wide, and there will likely be some damage to the surface near the annulus (as it is generally polished after the mirror surface). The mode diameter may be of order 200 um, though it is apparent that it is difficult to contact mirrors of small diameter. For example, some pressure sensors disclosed here use reflectors with 10 cm radius of curvature, 7.75 mm diameter mirrors.

Some pressure sensors disclosed here use hydroxide bonding to bond mirrors to the spacer. These can have an exponential frequency change equivalent to a bond shrinkage of ~100 nm. Some pressure sensors disclosed here use a thinner bond, such as by applying a clamping force, to reduce the bond length change to an acceptable level, allowing for smaller mirrors to be used.

Vacuum is used in the reference cavity, and for a commercial product in a regular commercial environment, it may have to come back to life after a period of being switched off. Some pressure sensors disclosed here use a small ion pump, optionally if the outgassing rate of the cavity volume is sufficiently low. The cavity can be baked at a few hundred C to get rid of volatiles. Some pressure sensors disclosed here use cavities bakes at 80 C, though the effect on cavity drift can be not uniform at this temperature. Some pressure sensors disclosed here use cavities bakes at ~400 C, optionally under high vacuum. Drift is considered because too large a drift would compromise the device accuracy.

Some pressure sensors disclosed here use a non-evaporable getter pump may suffice if Helium is not an issue. Some pressure sensors disclosed here have a finesse of >500 000 to ~350 000, optionally ~50 000

One further consideration is the optical design. Fiber optics are inexpensive and have a plug-and-play convenience. Bend-insensitive fiber can be used to improve how compactly the parts can be packaged, though the requirements for splicing make free space micro-optics a more compact approach for some beam paths.

Some pressure sensors disclosed here use nitrogen or argon (e.g., gases for which the refractive index ratio to that of helium has been measured). Some pressure sensors disclosed here use a differential gauge placed between the dual FP sensor using nitrogen and the gas of interest.

Some pressure sensors disclosed here use a version of Egan and Stone [16] in which the laser is frequency stabilized to rubidium in a quasi-monolithic structure [15]. There are consideration of the requirements for frequency doubling from 1556 nm, or using 778 nm, which would require a measurement of the refractive index.

The NIST photonic pressure sensor is essentially a refractometer, linking the gas pressure measurement directly to a frequency measurement of a resonant cavity. This allows one to access the level of precision afforded by frequency counting. The mode in the FLOC sensor lives only in either vacuum or the gas whose refractivity is to be measured. Using integrated photonics approaches at least partially changes this, forcing the optical mode to be guided in some type of waveguide. Some pressure sensors disclosed here use two modes in a single waveguide to obtain a significant amount of common-mode rejection of the shifts induced by the resonator's length and index changes as a function of temperature and other environmental perturbations.

The second challenge was already addressed above regarding the miniaturization of the standard cavity approach, and it is related to the increase in free-spectral-range for smaller resonators. This problem does not affect the performance of the sensor, instead, it increases the cost of the final product by necessitating higher frequency signals and components. However, integrated photonics of some of the pressure sensors disclosed here use can provide a path to mitigate the problem of high free-spectral-range in smaller resonators by using long delay lines in waveguides such as spiral resonators.

Figure 14:
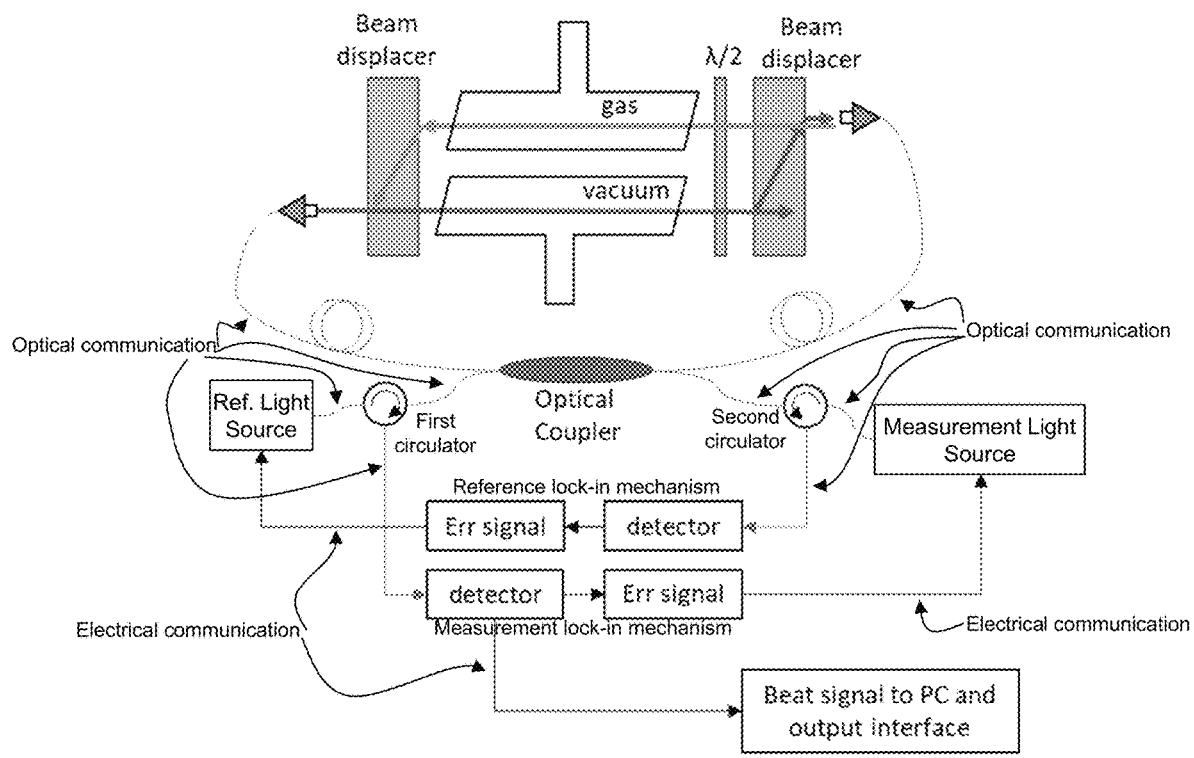
FIG. 14. A diagram of an exemplary pressure sensor according to certain embodiments, using a fiber-based cavity with a short section to measure the refractivity difference between a gas under test and vacuum. Most of the cavity is comprised of optical fiber with a short section where the clockwise and counter-clockwise beams travel through free space. The long fiber cavity helps the implementation of the sensor by keeping all required frequencies low. The cells can be both evacuated, filled with the same gas, or swapped to test for systematic effects. A similar setup can be used at high optical power to induce the generation of stimulated Brillouin scattering leading to narrower laser linewidths and potentially higher resolution.
Figure 15A:
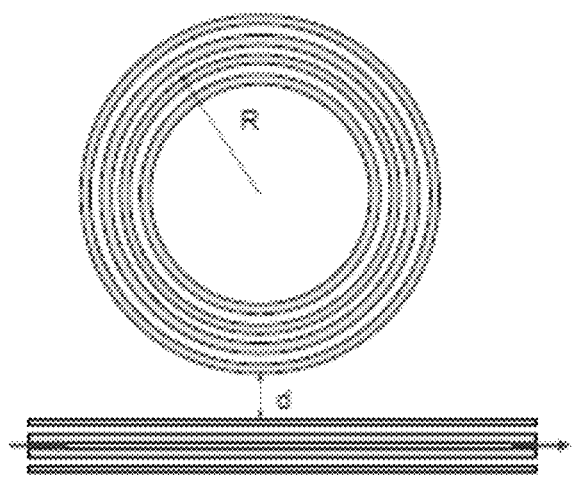
FIGS. 15A-15C. A slot waveguide can have >50% of the optical power propagating outside the waveguides.
Figure 15B:
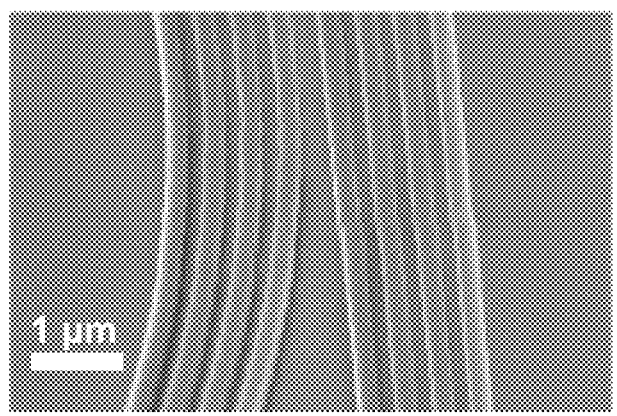
Figure 15C:
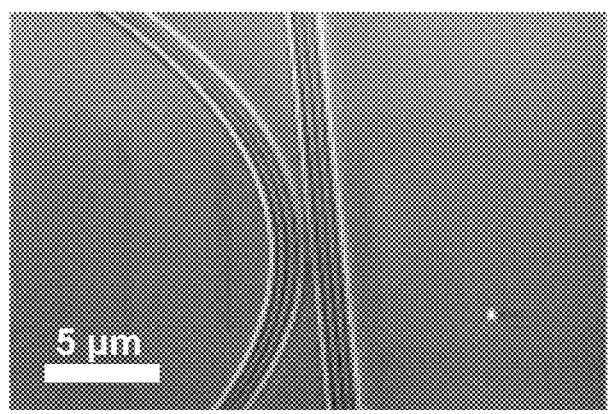
Figure 17:
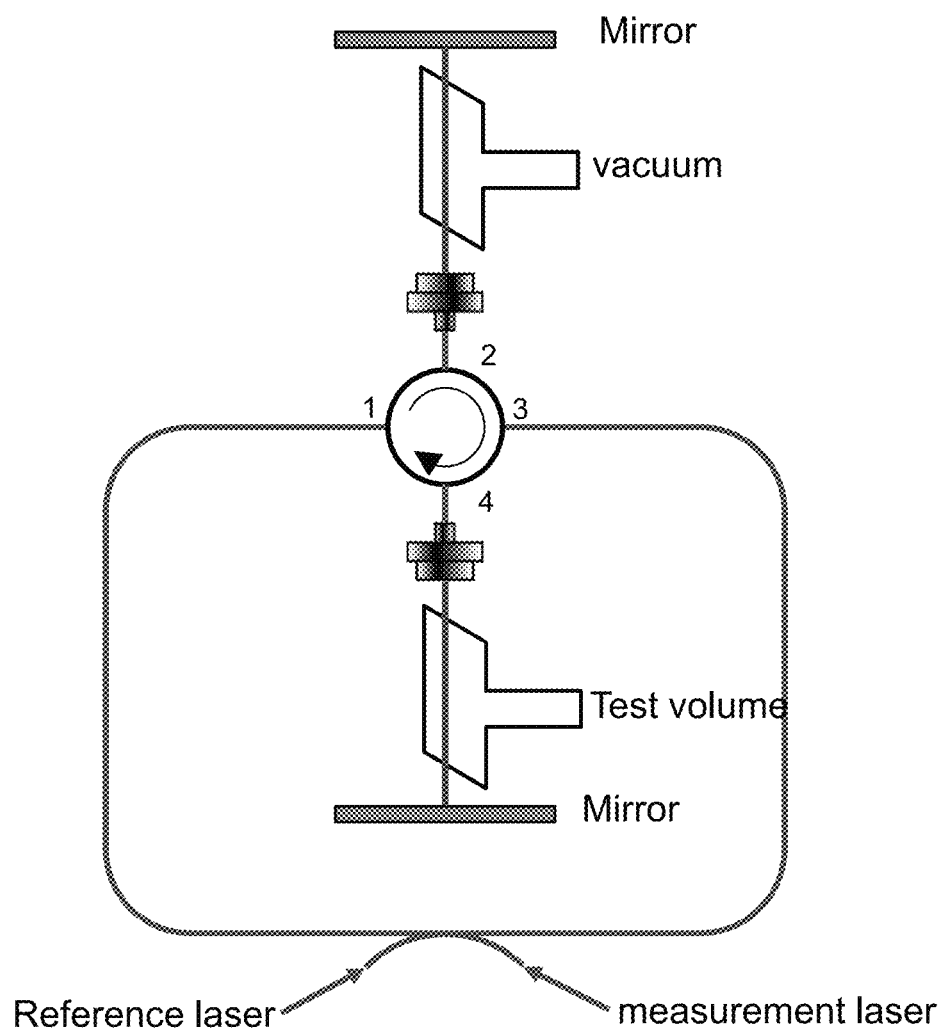
FIG. 17. A schematic of an exemplary pressure sensor, according to certain embodiments. The optical component represented by a circle with a rounded arrow therein is an optical circulator, according to certain embodiments.

Some pressure sensors disclosed here use fiber resonators. For example, an optical fiber can be wound in a small package to obtain cavities with low free-spectral-range, in the range of 200 MHz or less. At the same time, a small region of the cavity can be made to travel through free-space to interact with the gas under test. To obtain good suppression of the fiber drifts, two modes in the same fiber can be used. Possibilities include two polarizations in one fiber or two counter-propagating modes in a fiber loop. The first option allows for a simple implementation by using a short free-space section where the two polarizations travel through different paths, one sampling the gas of interest and the other sampling a reference path. The second option has the advantage that it avoids the differential thermo-optic coefficients between the two orthogonal polarizations in fiber. In this case, the degeneracy between these two modes can be lifted in the free-space region as well, by using polarization optics akin to those inside optical isolators, such as shown in FIG. 14 or FIG. 17, for example. In this way, the two counter-propagating cavities can be made to share all the same components except for the gas under test. Additional improvements to this approach can use stimulated Brillouin scattering in the fiber to further reduce the linewidth of the sensing laser. Interestingly, if Brillouin scattering is used, the first and second order Stokes waves can be used to sample the co- and counter-propagating paths with a single pump laser.

For example, in the exemplary pressure sensor configuration of FIG. 14, the first (left) circulator (i) receives reference light from the "pump laser" and sends it to the "optical coupler", and (ii) receives light from the measurement cavity via the optical coupler and sends that to the measurement (bottom) lock-in mechanism. For example, in the exemplary pressure sensor configuration of FIG. 14, the second (right) circulator (i) receives measurement light from the "measurement laser" and sends it to the "optical coupler", and (ii) receives light from the reference cavity via the "optical coupler" and sends that to the reference (top) lock-in mechanism. For example, in the exemplary pressure sensor configuration of FIG. 14, the reference ("Ref.") light source can be a pump laser. For example, in the exemplary pressure sensor configuration of FIG. 14, the measurement light source can be a laser.

Some pressure sensors disclosed here use a slot-waveguide PIC resonator can have >50% of the optical power propagating outside the waveguide [16]. The slot waveguide can have a form of compensation for the dn/dT contribution to frequency change. This can be a Brilloun laser racetrack that is laid out next to the slot waveguide racetrack. The differential response of the two polarizations in a Brillouin laser can be used to read out the temperature of the substrate (assuming distances are small and gradients are small enough) [6].

The refractive index of helium can be calculated. Measurement of the ratio of the refractive index of the sense gas (nitrogen or argon) to Helium have been published by Egan [12] and others [13].

Some pressure sensors disclosed here use whispering gallery mode devices (PIC, Si or MgF or CaF disc) can have differential responses to temperature for different modes, either through different polarization [6] or different mode number [5]. The former could be attractive as a source of stable reference light. The latter is potentially useful for a lower sensitivity device: the exposure of the mode to the gas to be measured is low. The integrated photonics stabilization of lasers to Rb [14] also provides a path forward to a frequency stabilized laser in an integrated environment.

REFERENCES

[1] Patrick F Egan et al, *Comparison measurements of low-pressure between a laser refractometer and ultrasonic manometer*, Rev. Sci. Intrum. 87, 053113 (2016)

[2] J Hendricks et al, *The Emerging Field of Quantum Based Measurements for Pressure, Vacuum and Beyond*, J. Phys. Conf. Ser. 1065 162017 (2018)

[3] Karl Jousten et al, *Perspectives for a new realization of the pascal by optical methods*, Metrologia 54 S146 (2017) https://doi.org/10.1088/1681-7575/aa8a4d

[4] Jiang Li et al, *Characterization of a high coherence, Brillouin microcavity laser on silicon*, Optics Express Vol. 20, p 20170 (2012)

[5] Xingwang Zhang et al, *Ultralow sensing limit in opto-fluidic micro-bottle resonator biosensor by self-referenced differential-mode detection scheme*, Appl. Phys. Lett. 104, 033703 (2014); doi: 10.1063/1.4861596

[6] William Loh et al, *Ultra-Narrow Linewidth Brillouin Lasers with Nanokelvin Thermometry*, Optica 6 (2), 152-159 (2019)

[7] Sarat Gundavarapu et al, *Sub-hertz fundamental linewidth photonic integrated Brillouin laser*, Nature Photonics 13, pages 60-67 (2019)

[8] I Silander, T Hausmaninger, C Forssén, M Zelan, O Axner, *Gas equilibration gas modulation refractometry (GEq-GAMOR) for assessment of pressure with sub-ppm precision*, arXiv preprint arXiv:1903.08424

[9] I Silander et al, *Optical measurement of the gas number density in a Fabry-Perot cavity*, Meas. Sci. Technol. 24 (2013) 105207 (5pp)

[10] Julia Scherschligt et al, *Quantum-based vacuum metrology at the National Institute of Standards and Technology*, Journal of Vacuum Science & Technology A 36, 040801 (2018)

[11] Patrick F. Egan, *Cell-based refractometer for pascal realization*, Opt. Lett., 42, p2944, (2017)

[12] Patrick F. Egan, Jack A. Stone, Julia K. Scherschligt, and Allan H. Harvey, *Measured relationship between thermodynamic pressure and refractivity for six candidate gases in laser barometry*, Journal of Vacuum Science & Technology A 37, 031603 (2019); https://doi.org/10.1116/1.5092185

[13] C Gaiser and B Fellmuth, Polarizability of Helium, Neon, and Argon: New Perspectives for Gas Metrology, Phys. Rev. Lett. 120, 123203 (2018)

[14] Matthew T Hummon et al, *Photonic chip for laser stabilization to an atomic vapor with 10-11 instability*, Optica 5 040443-07 (2018)

[15] Patrick Egan and Jack Stone, *Absolute refractometry of dry gas to ±3 parts in* 109, Applied Optics/Vol. 50 p3076 (2011)

[16] Laurent Vivian, *Vertical multiple-slot waveguide ring resonators in silicon nitride*, Optics Express 16, p17237 (2008)

Example 13

In some embodiments, a measurement includes setting a sequence of pressures with the pressure controller and monitoring the photonic sensor. Multiple experimental variables are continuously logged into a text file. The main variable of interest is the inter-cavity beat frequency. Pressure can be calculated from a simple proportionality between pressure and frequency and the offset is adjusted.

The differential refractivity as a function of pressure leads to a differential fractional frequency shift as a function of pressure: $d_f/v_0/dP \approx 2.7 \times 10^{-9}/Pa$. Using this equation, we can convert from beat-note frequency to relative pressure. We can then use an arbitrary offset to match the pressures measured by the pressure controller. An error is calculated by assuming the pressure controller is 'truth' data.

After processing, raw frequency data is turned into pressure data and can be compared to pressure controller measurements.

Example 14

With reference to FIG. 14, lines in free-space in the cavity represent the paths that light would take for the measurement and reference cavities respectively, for example. The triangles represent a fiber connector, and in the section between them the light travels in free-space. An element which is not shown, but can be included is a lens or a plurality of lenses between the two fiber connectors to couple the light from one connector to the other with any efficiency. For example, a lens can be used as a collimator at each connector. The beam displacer displaces the light depending on its polarization and the lambda/2 represents a half-wave plate, which rotates the polarization of an incoming beam. In some embodiments include separate counter-propagating beams, similar as in an isolator or circulator design.

Some pressure sensors disclosed herein include two cavities out of one by using the clockwise and counter-clockwise modes of a single ring cavity. Some pressure sensors disclosed herein include some section where the two counter-propagating beams go through different paths so that we can sense the different environment. Some pressure sensors disclosed herein include a ring cavity that is comprised of a length of optical fiber, a four-port fiber optic coupler (this plays the role of an input and output mirror at the same time) and a free-space section where the beams are separated. Some pressure sensors disclosed herein separate clockwise and counter-clockwise beams by polarization using beam displacers.

Referring to FIG. 13 as an example, the distance between the cavity end mirrors (e.g., the top left round mirror and the back right slab mirror (the two mirrors on tangled facets)) determine the FSR. Correspondingly for the mirrors in the lower cavity.

The mode waist radius (which is radius of Gaussian intensity cross section where the wavefront is flat) characterizes the beam cross section at all other points inside the cavity. This is determined by the length of the cavity and the radius of curvatures of the end mirrors).

Example 15: Exemplary Cavity Description

Figure 18A:
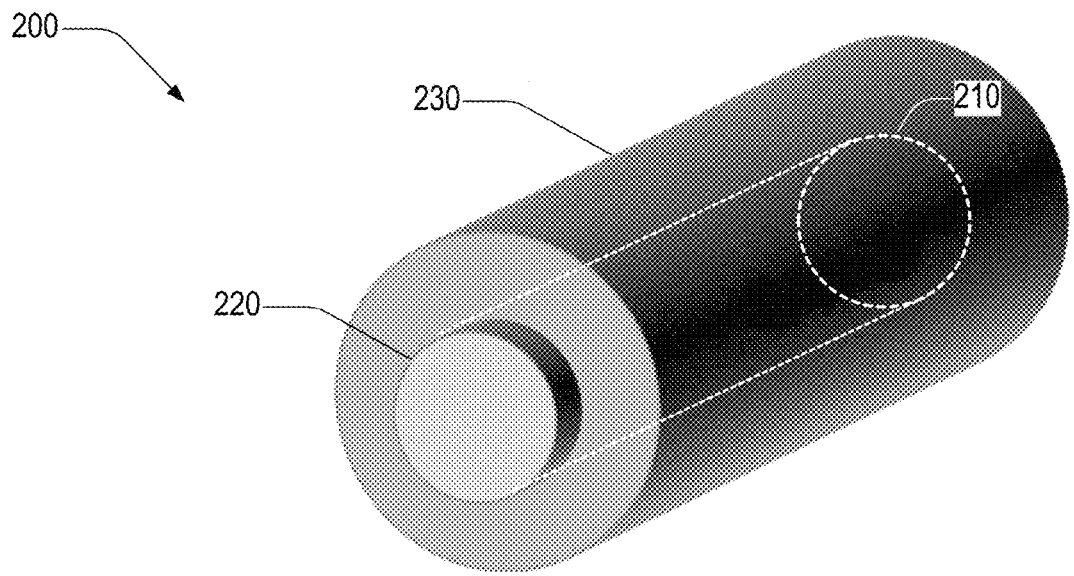
FIG. 18A. A perspective view of an exemplary optical cavity, such as a measurement cavity and/or a reference cavity, according to certain embodiments.
Figure 18B:
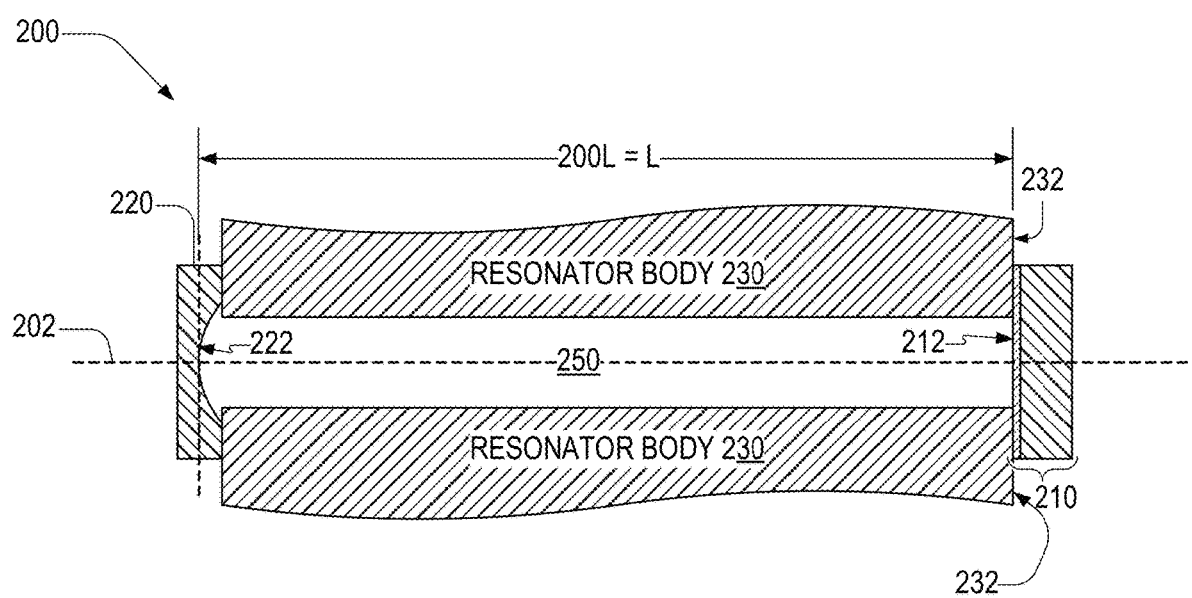
FIG. 18B. A cross-sectional view of the exemplary optical cavity of FIG. 18A.

FIGS. 18A-18B and the description thereof is based on optical cavities in Notcutt, et al. (US Pat. No. 1,0141,712). FIGS. 18A and 18B are a perspective view and a cross-sectional view, respectively, of an optical cavity 200, and are best viewed together in the following description. Optical cavity 200 is an exemplary cavity, such as a measurement cavity and/or a reference cavity, according to certain embodiments disclosed herein. Optical cavity 200 includes a first mirror 210, a second mirror 220, and a resonator body 230 therebetween. Resonator body 230 has an end surface 232. First and second mirrors 210 and 220 have respective reflective surfaces 212 and 222 separated by a cavity length 200L, hereinafter also referred to as L, along a cavity axis 202. Each of reflective surfaces 212 and 222 may be either planar or non-planar. The cross-sectional view of FIG. 18B is in a plane that includes cavity axis 202. Optical cavity 100 may be rotationally symmetric about cavity axis 202. Cavity length 200L is ten centimeters, for example. Surface 212 of mirror 210 adjoins end surface 232 of resonator body 230. Surfaces 212 and 232 may be directly bonded, via optical contact bonding and/or chemically activated direct bonding for example, such that no unwanted intermediate material is introduced between surfaces 212 and 232, or that the extend of any unwanted intermediate material between surfaces 212 and 232 is minimized.

Resonator body 230 may be formed of a material, such as a glass, having a low coefficient of thermal expansion. Examples include, but are not limited to, ULE® glasses by Corning, Inc., such as Corning 7972 glass, Corning 7973 glass, a high-temperature ULE® glass, Asahi AZ glass, sapphire, NEXCERA, AllVar, Invar, and any combination thereof. Resonator body 230 may have a thermal coefficient of expansion of less than fifty parts-per-billion-per-degree-Celsius (ppb/° C.) at temperatures between 5° C. and 55° C.

Optical cavity 200 encloses a medium 250 that has a refractive index η1. The internal volume of cavity 200 comprises medium 250. Medium 250 is, for example, vacuum or one or more gases. Optical cavity 200 has a resonance frequency $v_q = q\ c/2L + f_0$, herein after Equation 1, where c is the speed of light in vacuum and $f_0$ is an offset frequency. Integer q denotes a first mode number. Quantity c/2L is the free-spectral range of cavity 100, $FSR_{100}$.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

Every sensor, device, system, mechanism, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that system components such as certain optical or electrical devices or components can be employed in the practice of the invention without resort to undue experimentation. All art-known functional equivalents of any such materials, devices, components, systems, and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A pressure sensor for determining pressure in an environment, comprising:
   a source for emitting a coherent reference light characterized by a reference light frequency; wherein the coherent reference light is further characterized by at least one phase modulation frequency;
   an optical splitter for splitting the reference light into at least a first reference light and a second reference light;
   a first lock-in mechanism configured to send an electrical signal to the source based on a reference resonance frequency;
   a reference cavity configured to receive at least a portion of the first reference light;
   wherein the reference cavity is characterized by the reference resonance frequency;
   and wherein a pressure within an internal volume or in a reference space of the reference cavity is less than or equal to 0.1 mTorr;
   a modulator configured to receive the second reference light and modulate the second reference light to generate at least a first sideband frequency such that an output of said modulator is a measurement light comprising at least the first sideband frequency;
   a frequency synthesizer configured to drive the modulator;
   a second lock-in mechanism configured to send an electrical signal to the frequency synthesizer based on a measurement resonance frequency;
   a measurement cavity configured to receive at least a portion of the measurement light; wherein the measurement cavity is characterized by the measurement resonance frequency; and
   a processing mechanism configured to determine the pressure of the environment based on the reference resonance frequency and the measurement resonance frequency; wherein the processing mechanism comprises machine readable instructions to determine the pressure of the environment based on the reference resonance frequency and the measurement resonance frequency.

2. The pressure sensor of claim 1, comprising a frequency counter in electrical communication with the frequency synthesizer; wherein the processing mechanism is in electrical communication with the frequency counter to determine the pressure of the environment.

3. The pressure sensor of claim 1, wherein the first lock-in mechanism is configured to send the electrical signal to the source based on an interference ("first interference") of the at least one phase modulation frequency and the reference resonance frequency; and wherein the second lock-in mechanism is configured to send the electrical signal to the frequency synthesizer based on an interference ("second interference") of the at least one phase modulation frequency and the measurement resonance frequency.

4. The pressure sensor of claim 3, wherein the first interference is a first beat note corresponding to the at least one phase modulation frequency and the reference resonance frequency; and wherein the second interference is a second beat note corresponding to the at least one phase modulation frequency and the measurement resonance frequency.

5. The pressure sensor of claim 3, wherein the pressure of the environment is determined based on a comparison of the first interference and the second interference.

6. The pressure sensor of claim 1, wherein the first lock-in mechanism comprises a technique based on the Pound-Drever-Hall technique to lock the reference light frequency of the reference light to the reference resonance frequency of the reference cavity; and wherein the second lock-in mechanism comprises a technique based on the Pound-Drever-Hall technique to lock the first sideband frequency of the measurement light to the measurement resonance frequency of the measurement cavity.

7. The pressure sensor of any of claim 1, wherein the first lock-in mechanism is configured to send the electrical signal to the source for modulating at least one of the reference light frequency and the at least one phase modulation frequency; and wherein the second lock-in mechanism is configured to send the electrical signal to the frequency synthesizer for modulating at least one of the first sideband frequency and the at least one phase modulation frequency.

8. The pressure sensor of claim 1, comprising an error signal modulator to generate the at least one phase modulation frequency of the reference light.

9. The pressure sensor of claim 1, wherein at least one phase modulation frequency is characterized by an offset from the reference light frequency selected from the range of 1 MHz to 200 MHz.

10. The pressure sensor of claim 1, wherein the first lock-in mechanism is configured to send the electrical signal to the source indirectly; wherein the first lock-in mechanism is configured to send the electrical signal to a first servo, the first servo being configured to modulate the source; and wherein the second lock-in mechanism is configured to send the electrical signal to the frequency synthesizer indirectly; wherein the second lock-in mechanism is configured to send the electrical signal to a second servo, the second servo being configured to modulate the frequency synthesizer.

11. The pressure sensor of claim 1, wherein at least one of the first lock-in mechanism and the second lock-in mechanism comprises an oscillator for providing a frequency modulation to the at least one of the first lock-in mechanism and the second lock-in mechanism.

12. The pressure sensor of claim 1, wherein at least one of the first lock-in mechanism and the second lock-in mechanism comprises an error signal generator.

13. The pressure sensor of claim 1, comprising at least one optical detector configured to measure a cavity frequency difference, the cavity frequency difference being a difference between the reference resonance frequency and the measurement resonance frequency.

14. The pressure sensor of claim 13, comprising an optical combiner to combine a reference cavity light and a measurement cavity light, thereby forming a combined cavity light; wherein the at least one optical detector is configured to optically detect the combined cavity light; wherein the reference cavity light is characterized by the reference resonance frequency and the measurement cavity light is characterized by the measurement resonance frequency; wherein the pressure sensor comprises a frequency counter in electrical communication with the at least one optical detector and configured to measure a cavity frequency difference, the cavity frequency difference being a difference between the reference resonance frequency and the measurement resonance frequency; and wherein the cavity frequency difference corresponds to a cavity beat frequency corresponding to an interference of the reference resonance frequency and the measurement resonance frequency; the frequency counter being configured to determine the cavity beat frequency.

15. The pressure sensor of claim 1, wherein the modulator is configured to suppress the reference light frequency, such that an intensity at the reference light frequency in the measurement light is less than an intensity at the reference light frequency in the second reference light.

16. The pressure sensor of claim 1, wherein at least a portion of a body of each of the reference cavity and the measurement cavity is exposed to the pressure of the environment.

17. The pressure sensor of claim 1, wherein the pressure within the internal volume of the reference cavity is less than or equal to $1 \times 10^{-5}$ Torr.

18. The pressure sensor of claim 1, wherein the pressure sensor is configured to measure pressure selected from the range of 1 kPa to 100 kPa with a precision selected from the range of 3 ppm to 10 ppm.

19. The pressure sensor of claim 1, further comprising at least one in-phase/quadrature (IQ) optical hybrid for determining a sign corresponding to a cavity frequency difference, the at least one IQ optical hybrid being in optical communication with the reference cavity and the measurement cavity; wherein the cavity frequency difference is a difference between the reference resonance frequency and the measurement resonance frequency.

20. The pressure sensor of claim 1, wherein the source and the modulator are in optical communication via at least one optical fiber, the source and the reference cavity are in optical communication via at least one optical fiber, and the modulator and the measurement cavity are in optical communication via at least one optical fiber.

21. The pressure sensor of claim 1 comprising at least one fiber resonator, the at least one fiber resonator comprising the reference cavity and the measurement cavity and the at least one fiber resonator being characterized by the reference resonance frequency and the measurement resonance frequency, respectively.

22. A pressure sensor for determining pressure in an environment, comprising:

a source for emitting a coherent reference light characterized by a reference light frequency; wherein the coherent reference light is further characterized by at least one phase modulation frequency;

a modulator configured to receive the coherent reference light and modulate the coherent reference light to generate at least a first sideband frequency and a second sideband frequency such that an output of said modulator is a modulated light comprising at least the first sideband frequency and the second sideband frequency;

a frequency synthesizer configured to drive the modulator;

an optical splitter for splitting the modulated light into at least a first reference light and a measurement light;

a first lock-in mechanism configured to send an electrical signal to the source based on a reference resonance frequency;

a reference cavity configured to receive at least a portion of the first reference light;

wherein the reference cavity is characterized by the reference resonance frequency;

and wherein a pressure within an internal volume or in a reference space of the reference cavity is less than or equal to 0.1 mTorr;

a second lock-in mechanism configured to send an electrical signal to the frequency synthesizer based on a measurement resonance frequency;

a measurement cavity configured to receive at least a portion of the measurement light; wherein the measurement cavity is characterized by the measurement resonance frequency; and a processing mechanism configured to determine the pressure of the environment based on the reference resonance frequency and the measurement resonance frequency; wherein the processing mechanism comprises machine readable instructions to determine the pressure of the environment based on the reference resonance frequency and the measurement resonance frequency.

\* \* \* \* \*